US011348246B2

(12) United States Patent
Phogat et al.

(10) Patent No.: US 11,348,246 B2
(45) Date of Patent: May 31, 2022

(54) SEGMENTING OBJECTS IN VECTOR GRAPHICS IMAGES

(71) Applicant: Adobe Inc., San Jose, CA (US)

(72) Inventors: Ankit Phogat, Noida (IN); Viresh Gupta, New Delhi (IN); Vineet Batra, Pitam Pura (IN); Aanshul Ashwinkumar Sadaria, Ahmedabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/679,870

(22) Filed: Nov. 11, 2019

(65) Prior Publication Data

US 2021/0142479 A1 May 13, 2021

(51) Int. Cl.
*G06T 7/11* (2017.01)
*G06T 11/60* (2006.01)
*G06T 11/20* (2006.01)
*G06T 7/143* (2017.01)

(52) U.S. Cl.
CPC ............ *G06T 7/11* (2017.01); *G06T 7/143* (2017.01); *G06T 11/206* (2013.01); *G06T 11/60* (2013.01); *G06T 2207/20076* (2013.01); *G06T 2207/20081* (2013.01); *G06T 2207/20101* (2013.01)

(58) Field of Classification Search
None
See application file for complete search history.

(56) References Cited

U.S. PATENT DOCUMENTS

| 2002/0159641 | A1* | 10/2002 | Whitney | G06K 9/6228 382/219 |
| 2004/0083430 | A1* | 4/2004 | Boonen | G06F 40/151 715/249 |
| 2005/0193327 | A1* | 9/2005 | Chao | G06F 40/166 715/256 |
| 2013/0022330 | A1* | 1/2013 | Carter | H04N 21/4788 386/224 |
| 2014/0313206 | A1* | 10/2014 | George | G06T 11/203 345/441 |
| 2017/0046613 | A1* | 2/2017 | Paluri | G06N 3/0454 |
| 2017/0091951 | A1* | 3/2017 | Yoo | G06T 7/11 |
| 2017/0357877 | A1* | 12/2017 | Lin | G06F 16/58 |

(Continued)

FOREIGN PATENT DOCUMENTS

CN 110047078 A * 7/2019 ........... G06K 9/4604

OTHER PUBLICATIONS

Ellis et al, 'Learning to Infer Graphics Programs from Hand-Drawn Images', Advances in neural information processing systems, 31, pp. 6059-6068. (Year: 2018).*

(Continued)

*Primary Examiner* — Patrick F Valdez
(74) *Attorney, Agent, or Firm* — FIG. 1 Patents

(57) ABSTRACT

In implementations of segmenting objects in vector graphics images, an object segmentation system can obtain points that identify an object in a vector graphics image, and determine a region of interest in the image that includes the object based on the points that identify the object. The object segmentation system can generate a heat map from the points that identify the object in the image, and a rasterized region from rasterizing the region of interest. The object segmentation system can generate a mask from the rasterized region and the heat map, the mask identifying pixels of the object in the rasterized region, and determine, from the mask, paths of the vector graphics corresponding to the object.

20 Claims, 11 Drawing Sheets

(56) References Cited

U.S. PATENT DOCUMENTS

| | | | | |
|---|---|---|---|---|
| 2018/0108137 A1* | 4/2018 | Price | ......................... | G06T 7/11 |
| 2019/0035125 A1* | 1/2019 | Bellows | .................. | G06T 11/60 |
| 2020/0334874 A1* | 10/2020 | Phogat | .................... | G06T 11/60 |
| 2020/0364913 A1* | 11/2020 | Bradski | ................... | G06T 11/60 |

OTHER PUBLICATIONS

Sheehan A., 'Clipping Path vs. Masking: What's the Difference?', [online], [Dec. 5. 2020], https://clippingpathindia.com/blogs/tips/clipping-path-vs-masking-difference-comparison, Sep. 2019.*

Maninis et al, 'Deep Extreme Cut: From Extreme Points to Object Segmentation', 2018 IEEE/CVF Conf. on CVPR, pp. 616-625. (Year: 2018).*

"How to use the lasso tool in Adobe Illustrator", Retrieved at: https://www.youtube.com/watch?v=QLbokYp8JBU, Oct. 5, 2012, 1 page.

"Inkscape Tutorial & Training: Touch Selection Tool", Retrieved at: https://www.youtube.com/watch?v=uWEP7IEofGI, Jul. 29, 2018, 1 page.

He,"Deep Residual Learning for Image Recognition", Proceedings of the IEEE conference on computer vision and pattern recognition, 2016., Dec. 10, 2015, 12 pages.

He,"Mask R-CNN", In Proceedings of the IEEE International Conference on Computer Vision, Jan. 24, 2018, 12 pages.

Oh,"Fast Video Object Segmentation by Reference-Guided Mask Propagation", In the IEEE Conference on Computer Vision and Pattern Recognition (CVPR), Jun. 18, 2018, pp. 7376-7385.

Rajchl,"DeepCut: Object Segmentation from Bounding Box Annotations using Convolutional Neural Networks", Jun. 5, 2016, 10 pages.

* cited by examiner

700 

```
┌─────────────────────────────────────────────────────┐
│ Determine a region of interest that includes an object in an image │
│  having vector graphics, determining the region of interest based │
│   on points on the image corresponding to a boundary of the object │
│                         702                         │
└─────────────────────────────────────────────────────┘
                            │
                            ▼
┌─────────────────────────────────────────────────────┐
│          Generate a heat map from the points        │
│           by applying a kernel to the points        │
│                         704                         │
└─────────────────────────────────────────────────────┘
                            │
                            ▼
┌─────────────────────────────────────────────────────┐
│          Generate a mask of the object from the     │
│          region of interest and the heat map        │
│                         706                         │
└─────────────────────────────────────────────────────┘
```

FIG. 7

SEGMENTING OBJECTS IN VECTOR GRAPHICS IMAGES

BACKGROUND

Segmenting objects in images refers to the selection of the objects in the images, and is among the most common operations in image editing, since objects must be selected before applying editing operations, such as color adjustment, to the objects. For images (sometimes referred to as artworks) in which objects are defined by vector graphics, such as curves, splines (e.g., piecewise polynomials), and the like, segmenting the objects can be particularly difficult and inaccurate, since the complexity of the vector graphics can prevent designers from precisely selecting paths of the vector graphics that belong to a given object. For instance, paths defining multiple objects may overlap or be in close proximity to one another, making it difficult or impossible to select the paths of one of the objects without also selecting the paths of another one of the objects. As an example, some image editing systems provide tools for segmenting objects of images represented by vector graphics, such as a lasso tool or touch selection tool, in which a designer can draw a path on the image to select objects. These tools may segment objects that are intersected by the path or contained in the path drawn by the designer, but because of the complexity of the vector graphics, the designer may not be able to accurately and repeatedly segment a desired object of the image.

Some image editing systems use a pre-trained model to segment objects of an image, such as a neural network that is provided a rasterized image as input and generates an object identifier for each pixel of the rasterized image. However, these image editing systems may have limited utility, since they may not account for user intent that specifies a desired object of the image, and instead merely label pixels of the image with object identifiers. Moreover, the objects identified by these image editing systems are usually limited to belonging to classes of objects that are included in photorealistic training images used for training the model. Since vector graphics images can include abstract objects that are usually not found in the photorealistic training images (e.g., cars with eyes and arms), these image editing systems often fail to accurately segment objects of vector graphics images. Even if these image editing systems are re-trained with vector graphics images, they still generally do not accurately segment objects of vector graphics images due to the loss functions used for training, which often are limited to penalizing a foreground loss term. As a result, the image editing systems tend to hallucinate, and introduce objects or parts of objects that are not present in the original image, such as by adding a tail to the segmentation of a rabbit when the rabbit in the original image does not include a tail.

Accordingly, image editing systems do not accurately segment objects of vector graphics images, and can produce unacceptable results. This undesired behavior can be worsened when the image editing systems do not account for user intent. When user intent is considered, the image editing systems are tedious for designers to use and may still produce unacceptable results.

SUMMARY

Techniques and systems are described for segmenting objects in vector graphics images. An object segmentation system is implemented that can account for user intent and accurately and reliably segment objects of vector graphics images, even when the objects are not part of object classes used to train the object segmentation system, and when the objects are close to or obscured by other objects in the image. The object segmentation system can receive user inputs that identify an object in a vector graphics image, such as click points on a boundary of an object from mouse clicks or keyboard strokes. The object segmentation system can generate a heat map from the click points, such as by applying a Gaussian kernel centered at each of the click points. The object segmentation system can determine a region of interest that includes the object based on the click points that identify the object, and can rasterize the region of interest. The object segmentation system can provide the heat map and the rasterized region to a convolutional neural network, such as an encoder-decoder, that generates a mask for the object. The mask identifies pixels of the object in the rasterized region. The object segmentation system can determine, from the mask, paths of the vector graphics corresponding to the object, such as by determining a polyline corresponding to the mask, and determining paths of the vector graphics as visible paths of the vector graphics that are contained in the polyline, or that intersect an interior of the polyline.

The object segmentation system can be trained, such as by adjusting convolutional coefficients of an encoder-decoder according to a loss function that that combines a foreground loss term and a background loss term. The foreground loss term can encourage inclusion of the pixels of the object in the mask, and the background loss term can discourage inclusion in the mask of additional pixels not of the object. Hence, this loss function can prevent hallucinations, in which an undesired artifact not present in the original image is added to a segmented object.

Moreover, the object segmentation system can be trained with vector graphics images generated during training without user intervention, such as by combining vector graphics objects corresponding to a foreground theme and a vector graphics background corresponding to a background theme. The objects and backgrounds can be stored in one or more databases and accessed during training of the object segmentation system. To simulate user-supplied click points during training, the object segmentation system can generate an edge list for an object in an image based on a ground truth mask of the object, the edge list indicating line segments that define a polyline representing a border of the ground truth mask. The object segmentation system can generate a random number of random locations on the polyline, and randomly jitter the locations to form the click points. The simulated click points can be used by the object segmentation system to generate a heat map. Hence, the object segmentation system can generate a training dataset during training without user intervention that includes virtually an infinite number of vector graphics images and click points.

Accordingly, the object segmentation system can accurately segment objects of vector graphics images, without introducing hallucinations to the segmented objects. Moreover, the object segmentation system is not limited to segmenting only objects belonging to object classes in training images used to train the object segmentation system, but can also segment objects belonging to classes that are not included in training images used to train the object segmentation system. Furthermore, the object segmentation system accounts for user intent and can be efficiently operated by a designer, such as by receiving a limited number of user-defined click points corresponding to a rough boundary of an object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 7 illustrates a flow diagram depicting an example procedure in accordance with one or more aspects of the disclosure.

DETAILED DESCRIPTION

Overview

Figure 1:
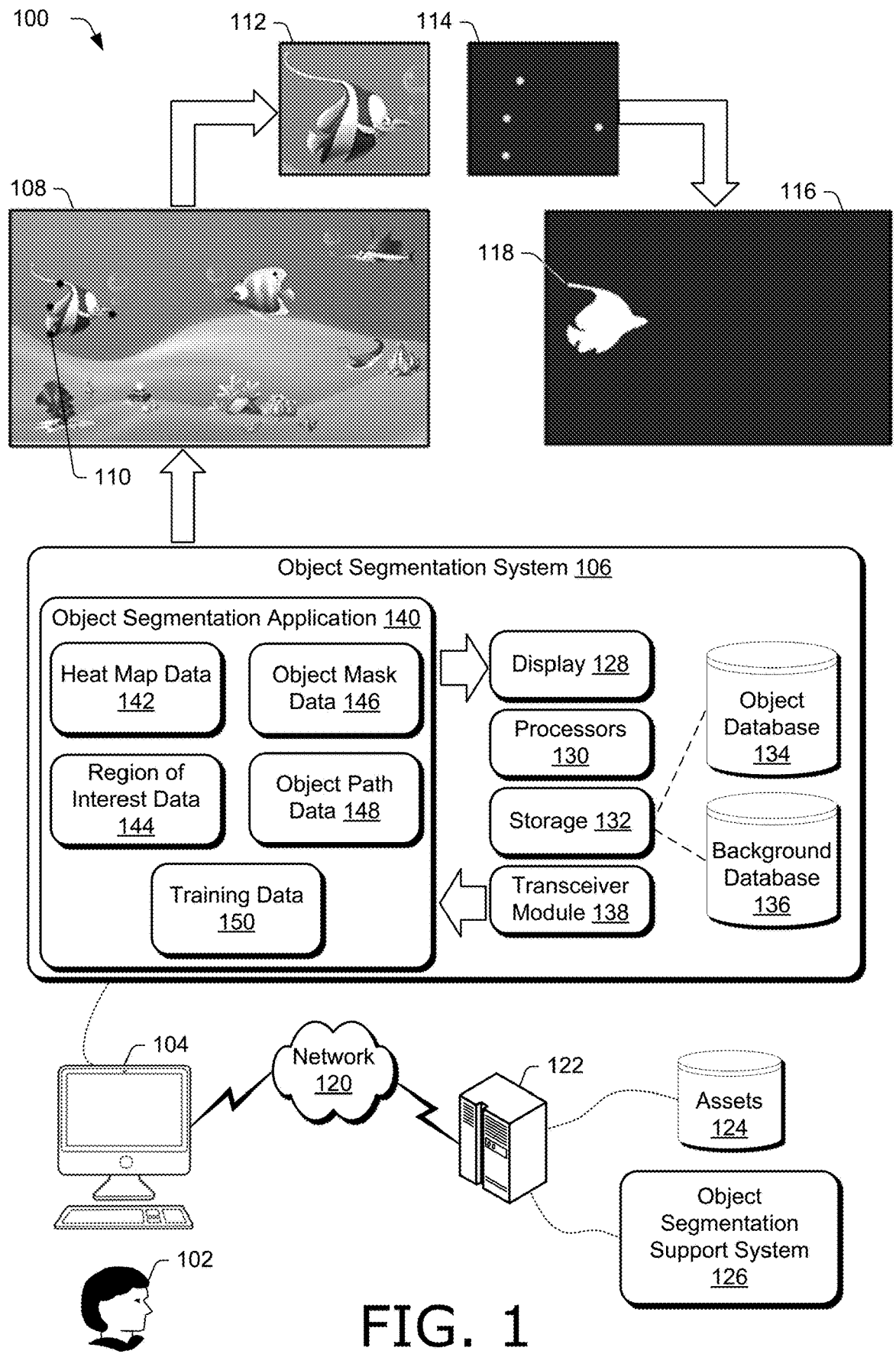
FIG. 1 illustrates a digital medium environment in an example implementation that is operable to employ techniques described herein.

Conventional image editing systems and object segmentation systems do not accurately segment objects of vector graphics images, and can produce unacceptable results. For instance, conventional systems may include tools for segmenting objects, such as a lasso tool or touch selection tool, in which a designer can draw a path on the vector image to select objects. These tools may select objects that are intersected by the path or contained in the path drawn by the designer, but because of the complexity of the vector graphics, including the number of Bezier curves and their proximity to one another, the designer may not be able to accurately and repeatedly segment a desired object of the image. For example, objects of vector graphics images may be touching one another or obscure one another, making it tedious and inefficient for designers to use conventional systems for segmenting objects in vector graphics images.

Moreover, conventional systems that use a pre-trained model for segmenting objects, such as a neural network, merely label pixels of an image with object identifiers and do not account for user intent. The object identifiers are usually limited to belonging to classes of objects that are included in photorealistic training images used for training the conventional image editing systems, and are not suitable for vector graphics images that, unlike photorealistic images, can include abstract objects, such as a car having eyes and arms. As a result, conventional systems can fail to segment objects of vector graphics images. Furthermore, because conventional systems are trained with foreground loss functions and not with background loss functions that instruct the system what not to include in an object mask, conventional systems can hallucinate by introducing artifacts to a segmented object, such as by adding a tail to the mask of a rabbit when the rabbit in the original image does not include a tail.

Accordingly, this disclosure describes systems, devices, and techniques for accurately segmenting objects in vector graphics images based on user intent, even when the objects are not part of object classes used to train the object segmentation system. The object segmentation system can receive user inputs that identify an object in a vector graphics image, such as click points on or near a boundary of an object from a mouse click or keyboard stroke. The object segmentation system can receive any suitable number of click points, such as two, three, four, or five, and the boundary may not be constrained to be a geometrical construct (e.g., represented by a mathematical formula). This allows the designer to provide free-form click points to identify a desired object of an image to be segmented. Hence, the object segmentation system is easily and efficiently operated by the designer, even when segmenting obscured objects or objects in close proximity to one another, such as an object that may share a boundary with other objects.

The object segmentation system can determine a region of interest of the vector graphics image based on the click points. In one example, the object segmentation system determines a rectangular region of interest that includes the object. The object segmentation system can determine the size of the region of interest based on the size of the area contained by the click points. Hence, the region of interest can include the object and an area outside the object that surrounds the object, so that the object consumes a substantial portion of the region of interest, such as at least 50% of the area of the region of interest. The object segmentation system can rasterize the vector graphics content of the region of interest to form a rasterized region that is used to determine a mask of the object. By using a rasterized region, rather than rasterizing the vector graphics of the entire image, the object segmentation system can focus on the portion of the image indicated by the user intent and allow the designer to work at an arbitrary resolution.

The object segmentation system can generate a heat map from the click points. In one example, the object segmentation system applies a Gaussian kernel centered at each of the click points to generate the heat map. The variance of the Gaussian kernel is an effective radius, and radially varies the intensity of the heat map from the center of the click points. In one example, the variance of the Gaussian kernel is set to ten. The heat map can be representative of the rasterized region. For instance, the object segmentation system can generate the rasterized region and the heat map to have a common resolution, such as 512×512 pixels, that correspond to a same portion of the vector graphics image.

The object segmentation system can generate a mask for the object indicated by the click points. The mask identifies pixels of the object in the rasterized region, e.g., pixels in the rasterized region belonging to the object. In one example, the mask is part of a mask image that includes pixels of a first color (e.g., white) that belong to the object, and pixels of a second color (e.g., back) that do not belong to the object. The object segmentation system can generate a mask by providing the heat map and the rasterized region to a convolutional neural network, such as an encoder-decoder. The encoder can include downsampling convolutional layers that generate a feature map from the rasterized region, and at least one convolutional layer that filters the heat map. In one example, the encoder includes a resnet50 architecture with pooling layers removed. The encoder can concatenate the feature map and the filtered heat map, and provide the result of the concatenating as input to the decoder. The decoder can include upsampling convolutional layers that process a result of the concatenating and skip connections from the layers of the encoder. Skip connections couple activations from a layer of the encoder to a layer of the decoder, which acts to refine the mask generation by tuning losses at different scales. Additionally or alternatively, the decoder can include additional skip connections within the layers of the decoder in the form of residual blocks. The output of the decoder can include a map that includes a respective probability for each pixel of the rasterized region. The probability for a given pixel indicates the likelihood the pixel belongs to the object. The object segmentation system can binarize the probabilities to generate the mask of the object. For instance, a pixel with a probability greater than a threshold probability, such as 0.85, may be assigned a white value and included in the mask of the object, and a pixel with a probability not greater than the threshold probability may be assigned a black value and excluded from the mask of the object.

The object segmentation system can determine, from the mask, paths of the vector graphics corresponding to the object. In one example, the object segmentation system determines a polyline corresponding to a border of the mask, such as based on a Ramer-Douglas-Peucker (RDP) algorithm that reduces the number of points representing the border of the mask to the endpoints of line segments making up the polyline. The endpoints can be stored as an edge list that defines the polyline. The object segmentation system can use the polyline as a predicate for containment of paths of the vector graphics. In one example, the object segmentation system implements a full containment mode that determines the paths corresponding to the segmented object as visible paths of the vector graphics that are contained in the polyline. Additionally or alternatively, the object segmentation system can implement a partial containment mode that determines the paths corresponding to the segmented object as visible paths of the vector graphics that intersect an interior of the polyline.

Furthermore, the object segmentation system can be implemented in a training mode in which weights of the object segmentation system are adjusted according to a loss function, such as by adjusting convolutional coefficients of an encoder, decoder, convolutional layer, or combinations thereof. The loss function can combine a foreground loss term and a background loss term. The foreground loss term can encourage inclusion of the pixels of the object in the mask, and the background loss term can discourage inclusion in the mask of additional pixels not of the object. Unlike loss functions that rely on a foreground loss term without a background loss term, this loss function can prevent hallucinations which introduce undesired artifacts not present in an image to a segmented object of the image.

Moreover, the object segmentation system can generate a dataset of training images that can be used to train the object segmentation system (e.g., for adjustment of convolutional weights of the object segmentation system). The object segmentation system can generate the training images without user intervention while the object segmentation system is trained (e.g., during training). In one example, the object segmentation system maintains an object database of vector graphics objects with their ground truth masks and a background database of vector graphics backgrounds. The vector graphics objects can be grouped according to foreground themes. Examples of foreground themes include buildings, cars, jungle, nature, office, people, sealife, and village. The object database can be addressed according to foreground theme, so that a query to the object database can include one or more foreground themes, and in response to the query, the database can return vector graphics objects belonging to the one or more foreground themes. The vector graphics backgrounds can be grouped according to background themes. Examples of background themes include city, people, nature, sealife, village, and office. The background database can be addressed according to background theme, so that a query to the background database can include a background theme, and in response to the query, the database can return a vector graphics background belonging to the background theme.

The object segmentation system can generate the training images by combining the vector graphics objects corresponding to a foreground theme and a vector graphics background corresponding to a background theme. As an example, the object segmentation system can implement the function call city: [Buildings, Cars, People] to combine vector graphics objects belonging to "Buildings," "Cars," and "People" foreground themes with a vector graphics background corresponding to a "city" background theme. By randomly generating the foreground and background themes and the number of vector graphics objects to be included in a training image, the object segmentation system can generate any suitable number of training images during the training operation, and without user intervention.

To simulate user-provided click points during training, the object segmentation system can generate an edge list for an object in a training image based on a ground truth mask of the object. For instance, the object segmentation system can apply an edge filter to a ground truth mask of an object, and apply an RDP algorithm to results of the edge filter to reduce the number of points produced by the edge filter. The object segmentation system may store the results of the RDP algorithm in an edge list that defines a polyline representing a border (or outline) of the mask of the object. The object segmentation system can generate a random number of random locations on the polyline, and randomly jitter the locations to form simulated click points. The amount of jitter can be determined based on a size of the polyline of the object mask. For instance, points for an object having a larger polyline may be jittered a larger amount than points for an object having a smaller polyline. In one example, locations on a polyline are jittered in a direction so that the points formed by the jittering remain on the polyline. Additionally or alternatively, locations on a polyline can be jittered in a direction so that the points formed by the jittering do not remain on the polyline. In one example, the points resulting from the jittering are constrained to be within a threshold distance from the polyline, such as within ten pixels from the polyline.

The simulated click points resulting from the jittering can be used by the object segmentation system to generate a heat map by applying a Gaussian kernel to the click points, as discussed above. Additionally or alternatively, the simulated click points resulting from the jittering can be used to generate a region of interest. The object segmentation system can use the heat map and the region of interest as input to an encoder-decoder to generate a mask for the object, and train the encoder-decoder based on the generated mask. In one example, the object segmentation system generates the simulated click points "on the fly" during training, automatically and without user intervention. For instance, the object segmentation system can generate a different number and a different set of simulated click points for a given vector graphics object each time the vector graphics object is included in an image used for training.

Accordingly, the object segmentation system can accurately segment objects of a vector graphics image without introducing hallucinations to the segmented objects, even when the objects are close to or obscured by other objects in the image. Moreover, the object segmentation system is not limited to segmenting only objects belonging to object classes in training images used to train the object segmentation system, but can also segment objects belonging to classes that are not included in training images used to train the object segmentation system. Furthermore, the object segmentation system accounts for user intent and can be efficiently operated by a designer, unlike conventional image editing systems.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 operating a computing device 104 depicted as a desktop computer, which is an example of computing device 104. Generally, computing device 104 can include any suitable type of computing device, such as a mobile phone, tablet, laptop computer, desktop computer, gaming device, goggles, glasses, camera, digital assistant, echo device, image editor, non-linear editor, digital audio workstation, copier, scanner, client computing device, and the like. Hence, computing device 104 may range from full resource devices with substantial memory and processor resources (e.g., personal computers, game consoles, etc.) to low-resource devices with limited memory or processing resources (e.g., mobile devices).

Notably, computing device 104 can include any suitable number of computing devices, such as one or more computing devices, (e.g., a smart phone connected to a tablet). Furthermore, discussion of one computing device of computing device 104 is not limited to that one computing device, but generally applies to each of the computing devices included in computing device 104. Furthermore, computing device 104 may be representative of one or a plurality of different devices connected to a network that perform operations "over the cloud" as further described in relation to FIG. 11. In one example, computing device 104 includes multiple computing devices communicatively coupled to each other, such as with a low power wireless communication standard (e.g., a Bluetooth® protocol). Hence, an asset (e.g., digital image, vector graphics image, animation, video, text, drawing, document, file, and the like) generated, processed, edited, or stored on one device of computing device 104 (e.g., a desktop computer) can be communicated to, and displayed on and processed by another device of computing device 104 (e.g., a tablet).

Various types of input devices and input instrumentalities can be used to provide input to computing device 104. For example, computing device 104 can recognize input as being a mouse input, drawing-tool input, stylus input, touch input, input provided through a natural user interface, and the like. Thus, computing device 104 can recognize multiple types of gestures including touch gestures and gestures provided through a natural user interface. In one example, computing device 104 includes speech recognition, identification, and synthesis functionalities, microphones, and speakers that allow computing device 104 to communicate with a user in a conversation, such as with user 102 in a user conversation.

Computing device 104 includes object segmentation system 106 for segmenting objects in vector graphics images. Object segmentation system 106 can be a standalone system, or a plug-in to an additional system. For instance, object segmentation system 106 can be included in a vector graphics image editing system, such as by incorporating object segmentation system 106 into Adobe Illustrator®, Inkscape, or the like. In the example in FIG. 1, object segmentation system 106 obtains image 108, which is an example of a vector graphics image that depicts objects (e.g., fish) against a sealife background, such as in an underwater environment. Object segmentation system 106 can obtain image 108 in any suitable way. In one example, object segmentation system 106 receives the image 108 from user 102. For instance, user 102 may provide the image 108 to object segmentation system 106 in order to segment objects of the image 108 and edit the image 108. Additionally or alternatively, object segmentation system 106 can generate the image 108 and use it for training, such as to adjust convolutional coefficients of a neural network of the object segmentation system 106. For example, object segmentation system 106 can generate the image 108 by combining vector graphics objects obtained according to a foreground theme (e.g., a "sealife" foreground theme) with a vector graphics background obtained according to a background theme (e.g., an "underwater" background theme). Object segmentation system 106 can obtain the vector graphics objects and the vector graphics background from one or more databases (discussed below in more detail).

The image 108 is depicted with points 110, which are examples of click points obtained by object segmentation system 106. Points 110 includes four click points denoted by dark circles, which lie roughly on the border of the fish on the left-hand side of the image 108. For clarity, only one of the points 110 is designated with a numerical marker, though the points 110 refers to the four dark circles of the image 108. The points 110 identify the fish in the image 108 by designating a boundary of the fish in the image 108. The object segmentation system 106 can obtain the points 110 in any suitable way. In one example, user 102 provides one or more user inputs that designates the points 110, such as by receiving mouse clicks, keyboard strokes, voice input (e.g., user speech), gestures, combinations thereof, and the like. For example, the user 102 may identify the fish with the points 110 to segment the fish from the image 108, so that the fish can be edited separately from other objects of the image 108, such as to change a color of the fish.

Additionally or alternatively, the object segmentation system 106 can obtain the points 110 by generating the points 110, and use the generated points in a training mode. For example, the object segmentation system 106 can obtain a ground truth mask of the fish, and determining an edge list of the ground truth mask. The edge list can indicate line segments that define a polyline representing a border of the ground truth mask. The object segmentation system 106 can then determine a random number of random locations on the polyline, and randomly jitter the random locations to form the points 110. Hence, the points 110 can be used for training, such as to adjust convolutional coefficients of a neural network of the object segmentation system 106.

Based on the points 110, the object segmentation system 106 determines a region of interest that includes the fish based on the points 110 that identify the fish. For example, the region of interest can include vector graphics of the image 108 that includes the fish and a surrounding area of the fish. The object segmentation system 106 can rasterize vector graphics of the image 108 in the region of interest to form a rasterized region 112. The rasterized region 112 can include any suitable number of pixels. In one example, the rasterized region 112 is 512×512 pixels. Additionally or alternatively, the resolution of the rasterized region 112 can be user-specified, such as via a user interface displayed on the computing device 104.

In one example, the object segmentation system 106 determines the region of interest and the rasterized region 112 to be rectangular regions. For instance, the object segmentation system 106 can determine a rectangular area of the image 108 corresponding to the points 110 so that all of the points 110 are contained within the rectangular area. The object segmentation system 106 can then inflate the rectangular area by an amount, such as by a percentage (e.g., 10%) in each of horizontal and vertical dimensions. The inflated rectangular area can be set as the region of interest, whose vector graphics content is then rasterized to produce the rasterized region 112. Hence, the rasterized region 112 includes the object to be segmented (e.g., the fish) and an area outside the object that surrounds the object, so that the object consumes a substantial portion of the rasterized region 112, such as at least 50% of the area of the rasterized region 112.

Based on the points 110, the object segmentation system 106 generates a heat map 114. The heat map 114 can be representative of the rasterized region 112. For instance, the heat map 114 and the rasterized region 112 can correspond to the same content of the image 108 and be of a same size, such as 512×512 pixels. The object segmentation system 106 can generate the heat map 114 from the points 110 in any suitable way. In an example, the object segmentation system 106 applies a Gaussian kernel to each of the points 110. For instance, the Gaussian kernel can be applied separately to each of the points 110 by centering the Gaussian kernel at each of the points 110. The variance of the Gaussian kernel varies the intensity of the heat map radially from respective centers of the points 110. In one example, the variance of the Gaussian kernel is set to 10.

The object segmentation system 106 generates a mask image 116 from the rasterized region 112 and the heat map 114, such as with a neural network that includes an encoder and decoder that can generate a mask for the fish from the rasterized region 112 and the heat map 114. The mask image 116 includes the mask 118 of the fish depicted in the rasterized region 112 and designated by the points 110. The mask 118 of the object (e.g., the fish) identifies pixels in the rasterized region 112 that belong to the object, and depicts these pixels as white. Pixels not belonging to the object are depicted in mask image 116 as black. In the example of FIG. 1, the object segmentation system 106 scales the mask image 116 to a same proportion (e.g., aspect ratio and size) as the image 108.

The object segmentation system 106 can determine paths of the vector graphics of the image 108 corresponding to the mask 118. In one example, the object segmentation system determines a polyline corresponding to the mask 118, such as based on an RDP algorithm that reduces the number of points representing a boundary of the mask 118 to the endpoints of line segments making up the polyline. The object segmentation system 106 can use the polyline as a predicate for containment of paths of the vector graphics of the image 108. In one example, the object segmentation system 106 implements a full containment mode that determines the paths corresponding to the segmented object as visible paths of the vector graphics of the image 108 that are contained in the polyline. Additionally or alternatively, the object segmentation system 106 can implement a partial containment mode that determines the paths corresponding to the segmented object as visible paths of the vector graphics of the image 108 that intersect the interior of the polyline.

Hence, the object segmentation system 106 can accurately segment objects of vector graphics images, while accounting for user intent in the form of user-defined click points that correspond to a boundary of an object. Accordingly, the object segmentation system 106 can be efficiently operated by a designer, without requiring the designer to tediously draw paths around an object or through an object that do not intersect other objects, like conventional systems.

Computing device 104 is also coupled to network 120, which communicatively couples computing device 104 with server 122. Network 120 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 122 may include one or more servers or service providers that provide services, resources, assets, or combinations thereof to computing device 104. Services, resources, or assets may be made available from server 122 to object segmentation system 106, and stored at assets 124 of server 122. For instance, vector graphics images, vector graphics objects, vector graphics backgrounds, and the like can be stored at assets 124 and made available to computing device 104. Hence, object segmentation system 106 can include any suitable asset stored at assets 124 of server 122.

Server 122 includes object segmentation support system 126 configurable to receive signals from computing device 104, process the received signals, and send the processed signals to computing device 104 to support segmenting objects in vector graphics images. For instance, computing device 104 may obtain a vector graphics image (e.g., image 108) and click points that identify an object in the image, such as points 110. Computing device 104 may use the object segmentation system 106 to determine a region of interest and a heat map based on the points, such as rasterized region 112 and heat map 114, respectively, and communicate the region of interest and the heat map along with any suitable data to server 122. Server 122, using object segmentation support system 126, may generate a mask image (e.g., mask image 116) from the region of interest and the heat map, and communicate the mask image back to the computing device 104. Using object segmentation system 106, the computing device 104 can determine paths of the vector graphics of the original image (e.g., image 108) corresponding to the object depicted by the mask image. Accordingly, object segmentation support system 126 of server 122 can include a copy of object segmentation system 106.

Computing device 104 includes object segmentation system 106 for segmenting objects in vector graphics images. Object segmentation system 106 includes a display 128, which can expose any suitable data used by or associated with object segmentation system 106. In one example, display 128 displays a user interface for segmenting objects in vector graphics images. Display 128 can include any suitable type of display, such as a touchscreen, liquid crystal display, plasma display, head-mounted display, projector and screen, and the like.

Object segmentation system 106 also includes processors 130. Processors 130 can include any suitable type of processor, such as a graphics processing unit, central processing unit, digital signal processor, processor core, combinations thereof, and the like. Hence, object segmentation system 106 may be implemented at least partially by executing instructions stored in storage 132 on processors 130. For instance, processors 130 may execute portions of object segmentation application 140.

Object segmentation system 106 also includes storage 132, which can be any suitable type of storage accessible by or contained in object segmentation system 106. Storage 132 stores data and provides access to and from memory included in storage 132 for any suitable type of data. For instance, storage 132 can include any suitable data used by or generated by the object segmentation system 106. As an example, storage 132 includes object database 134 and background database 136, which store vector graphics objects and vector graphics backgrounds, respectively. The vector graphics objects of the object database 134 can be stored with indicators of foreground themes, such as by including a foreground theme indicator in metadata of each vector graphics object. Examples of foreground themes include buildings, cars, jungle, nature, office, people, sealife, and village. The object database 134 can be addressed according to foreground theme, so that a query to the object database 134 can include one or more foreground themes, and in response to the query, the object database 134 can return vector graphics objects belonging to the one or more foreground themes. The vector graphics backgrounds of the background database 136 can be stored with indicators of background themes, such as by including a background theme indicator in metadata of each vector graphics background. Examples of background themes include city, people, nature, sealife, village, and office. The background database 136 can be addressed according to background theme, so that a query to the background database 136 can include a background theme, and in response to the query, the background database 136 can return a vector graphics background belonging to the background theme.

Furthermore, object segmentation system 106 includes transceiver module 138. Transceiver module 138 can be implemented in any suitable combination of hardware, software, and firmware to transmit and receive data using any suitable type and number of communication protocols. For instance, data from object segmentation system 106 can be transmitted to server 122 with transceiver module 138. Furthermore, data can be received from server 122 with transceiver module 138. Transceiver module 138 can also transmit and receive data between computing devices of computing device 104. In one example, transceiver module 138 includes a low power wireless communication standard (e.g., a Bluetooth® protocol) for communicating data between computing devices of computing device 104.

Object segmentation system 106 also includes object segmentation application 140 that can be implemented to segment objects in vector graphics images. Object segmentation application 140 can be implemented as any type of module or component in software (e.g., as software instructions that are executable with processors 130), hardware, or combinations thereof, as a standalone application or as a module or component of another device application, and in any type of computing device. In one example, object segmentation application 140 is integrated as a plug-in application to an image editing application that can be used to edit images that include vector graphics, such as Adobe Illustrator®. Hence, the object segmentation application 140 can be used to segment an object of a vector graphics image, which can then be edited via the image editing application.

Object segmentation application 140 can also include or have access to any suitable data for segmenting objects in vector graphics images, including heat map data 142, region of interest data 144, object mask data 146, object path data 148, and training data 150. In one example, one or more of heat map data 142, region of interest data 144, object mask data 146, object path data 148, or training data 150 is stored in storage 132 and made available to object segmentation application 140. Heat map data 142 can include any suitable data related to a heat map, such as a heat map, locations of points (e.g., click points), such as coordinate locations (e.g., Cartesian coordinates), a number of points, an order or sequence in which points are received, and an indicator of whether the points are user-supplied or generated by the object segmentation system 106 (e.g., generated for training). Heat map data 142 can also include data related to generating a heat map, such as user information describing a designer who provides click points via a user interface, such as a user identification or employee number, a history of user edits, a history of images edited by the user, etc. Heat map data 142 can also include ground truth masks, polylines determined from ground truth masks, and definitions of random variables used to generate click points, such as initializations of locations on a polyline and an amount of jitter applied to locations on the polyline to form click points, and information about a Gaussian kernel applied to click points, such as a variance of the Gaussian kernel, and whether the variance is a default value or a user-supplied value. Heat map data 142 can also include data regarding a rectangular region that contains the click points, such as an inflation amount used to generate the rectangular region, a number of pixels in the rectangular region, an aspect size of the rectangular region, and the like.

Region of interest data 144 can include any suitable data related to a region of interest of an image, such as a size of a region of interest relative to a size of a vector graphics image, locations on a vector graphics image that define a region of interest, such as locations of corners of a region of interest, vector graphics content in a region of interest, a rasterized region, a designator of a rasterization algorithm used to generate a rasterized region, and a size of a rasterized region (e.g., numbers of pixels and aspect ratio). Region of interest data 144 can also include an indicator of whether the size of the rasterized region is user-specified or a default value, and an indicator of whether the size of a rasterized region is a same size of a heat map. Region of interest data 144 can also include an inflation amount used to determine a size of a region of interest, such as a percentage in horizontal or vertical dimensions that a rectangular region is inflated to set the size or aspect ratio or both of the region of interest.

Object mask data 146 can include any suitable data related to an object mask, such as a mask image, pixels belonging to an object mask, pixels not belonging to an object mask, a mask image, an object identification number or annotation of an object that is segmented by the object mask, a size of an object mask (e.g., an area of an object determined from the ratio of pixels belonging to an object mask to pixels not belonging to the object mask), and combinations thereof. Object mask data 146 can also include a polyline of an object mask (e.g., the polyline can represent an outline or border of the object mask), an edge filter used to determine the polyline, an edge list containing definitions of line segments that form the polyline, and definitions of an RDP algorithm used to form the edge list. Object mask data 146 can also include an architecture of a neural network used to generate an object mask (e.g., encoder and decoder connections, layers, residual block definitions, skip connections, convolutional weights, and global convolution blocks), a feature map generated from an encoder, a filtered heat map, the concatenation of a feature map and a filtered heat map, a probability map, and a threshold probability used to determine whether a pixel belongs to an object or does not belong to an object.

Object path data 148 can include any suitable data related to paths of an object, such as an indication of a containment mode (e.g., full containment or partial containment), an indication of whether the containment mode is user-specified or a default value, a z-order of paths (e.g., an order of paths that determine which paths are obscured by other paths), a polyline of an object mask, definitions of an RDP algorithm used to generate the polyline, visible paths of vector graphics of an image that are contained in the polyline of an object mask, visible paths of vector graphics of an image that intersect an interior of the polyline of an object mask, and combinations thereof. Object path data 148 can also include the vector graphics of an image, such as the vector graphics of image 108, and the vector graphics of a region of interest.

Training data 150 can include any suitable data related to training object segmentation system 106, such as a loss function, a foreground loss term, a background loss term, combining weights used to combine a foreground loss term and a background loss term to form a loss function, a ground truth mask, an object mask generated by object segmentation system 106, probabilities of pixels belonging to an object mask, a training loss determined by evaluating a loss function, the gradient of a loss function, and combinations thereof. Training data 150 can also include coefficients (e.g., convolutional coefficients of a neural network used to generate an object mask), error terms used to update the coefficients, a stepsize of an adaptive algorithm, regressor data used to update the coefficients, and a block size that determines a number of samples to accumulate when forming an error term or the gradient of a loss function.

Training data 150 can also include vector graphics images used to train the object segmentation system 106, including vector graphics objects, vector graphics backgrounds, foreground and background theme indicators, scaling, rotation, and translation parameters applied to vector graphics objects, an object database (e.g., object database 134), and a background database (e.g., background database 136). Training data 150 can also include simulated click points used to train the object segmentation system 106 and data related to the simulated click points, including ground truth masks of objects, a polyline of a ground truth mask, a random number of random locations on a polyline, statistics of the random variables used to generate the random number and the random locations, such as parameters of the probability density functions defining the random variables (e.g., mean, variance, median, mode, and type of distribution, such as Gaussian, uniform, binomial, etc.), an amount of jitter, and locations of click points (e.g., Cartesian coordinates). Training data 150 can also include a heat map and a region of interest of an image determined from the simulated click points, and a size of the heat map and the region of interest.

Example Object Segmentation System

Figure 2:
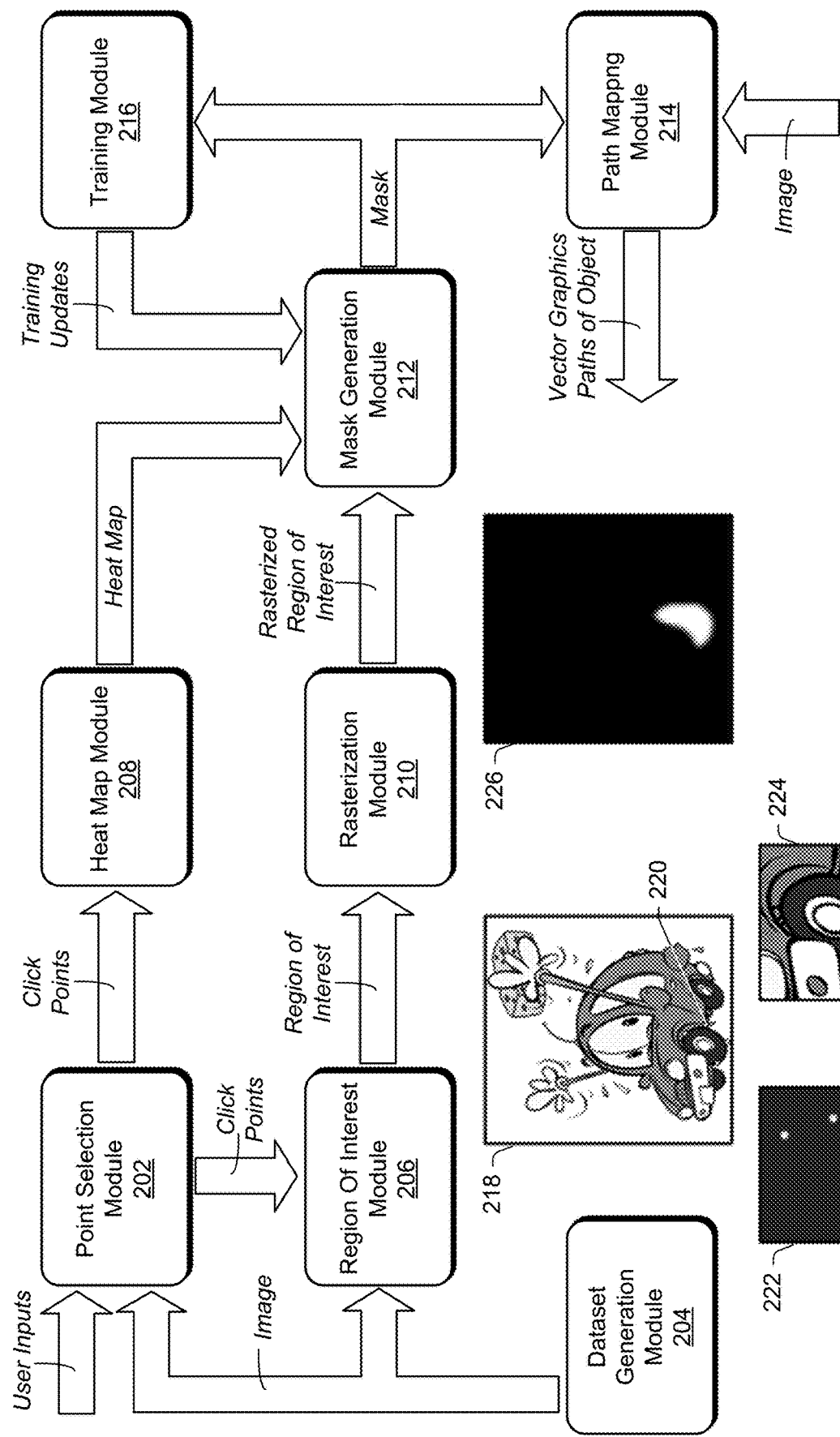
FIG. 2 illustrates an example system usable for segmenting objects in vector graphics images in accordance with one or more aspects of the disclosure.

FIG. 2 illustrates an example system 200 usable for segmenting objects in vector graphics images in accordance with one or more aspects of the disclosure. In this implementation, system 200 includes point selection module 202, dataset generation module 204, region of interest module 206, heat map module 208, rasterization module 210, mask generation module 212, path mapping module 214, and training module 216. These modules can be implemented as any type of module or component in software (e.g., as software instructions that are executable with a processing system), hardware, or combinations thereof, as a standalone application or as a module or component of another device application, and in any type of computing device. System 200 is one example of object segmentation system 106 that can be constructed using these modules. For instance, signals can be redefined, and modules can be modified, combined, divided, added, or removed to form a modified system, without altering the functionality of system 200. Accordingly, such modified systems are considered to be within the scope of the disclosure. Furthermore, for simplicity, system 200 is limited to these modules and a description of some of their interconnects. System 200 can, however, include any suitable signals and communications between modules omitted for simplicity. Such signals may include system clocks, counters, object indicators, sequence indicators, training indicators, reset signals, control signals, and the like. In one example, system 200 can operate in real time (e.g., with no perceptible delay to a user). Accordingly, signals can be calculated by the modules of system 200 and communicated between the modules of system 200 without significant delay, so that a designer can provide user inputs in the form of click points to system 200, which in response determines an object mask and vector graphics paths contained in or intersecting the object mask without perceptible delay to the designer.

Moreover, system 200 can be implemented on any suitable device or devices. In one example, system 200 is implemented on one computing device (e.g., computing device 104 in FIG. 1). In another example, system 200 is implemented on more than one computing device. For instance, parts of system 200 can be implemented by a first computing device, such as one computing device of computing device 104 in FIG. 1, and other parts of system 200 can be implemented by an additional computing device of computing device 104. Additionally or alternatively, a server can implement parts of system 200, such as server 122 in FIG. 1. A server can be remote, e.g., because it is not collocated with the first computing device. A server may be implemented to receive signals of system 200 from a computing device (e.g., computing device 104), process the received signals, such as with object segmentation support system 126, and transmit results of the processing back to the computing device. Hence, object segmentation support system 126 of server 122 in FIG. 1 can include system 200.

Additionally or alternatively, parts of system 200 can be implemented by an additional computing device that is collocated with a first computing device. For instance, one device of computing device 104 can be a first computing device, and another device of computing device 104 can be an additional, collocated computing device. The first computing device and the additional computing device can be operated by one or more users. Hence, system 200 can provide for multiple users within an environment to share data included in system 200.

Point selection module 202 can be implemented to obtain points (referred to as click points) on a vector graphics image that identify an object of the image. Point selection module 202 can receive a vector graphics image from dataset generation module 204, such as a vector graphics image used as training data to train the system 200. Additionally or alternatively, point selection module 202 can receive a vector graphics image from a user, such as part of user input. For instance, a user may supply a vector graphics image to system 200 to segment an object of the vector graphics image and edit the segmented object.

Point selection module 202 can obtain points (e.g., click points) on a vector graphics image in any suitable way. In one example, point selection module 202 obtains points by receiving one or more user inputs that designates two or more points on a vector graphics image, such as click points obtained from mouse clicks, keyboard strokes, voice input (e.g., user speech), gestures, combinations thereof, and the like. For instance, point selection module 202 can receive user inputs that includes a vector graphics image and click points that identify an object on the image, such as two or more click points on or near a boundary of the object.

Additionally or alternatively, point selection module 202 can generate click points to simulate user-provided click points. The object segmentation system 106 can use the simulated click points generated by the point selection module 202 to train any suitable module of system 200 or the object segmentation system 106, such as to adjust coefficients of a neural network of mask generation module 212. Image 218 is an example of a vector graphics image obtained by point selection module 202, and image 218 includes four click points 220 on the boundary of the front tire of the car depicted in image 218. The click points 220 are denoted by white circles, and for clarity, only one of the four click points 220 is designated with a numerical designator. The click points 220 can be user-supplied or generated by point selection module 202.

Point selection module 202 can generate click points (e.g., click points that simulate user-provided points) in any suitable way. In one example, point selection module 202 obtains a ground truth mask of an object in a vector graphics image, and determines an edge list of the ground truth mask that indicates line segments making up a polyline that represents a border of the ground truth mask. The point selection module 202 can generate a random number of random locations on the polyline formed from the edge list. The point selection module 202 can then randomly jitter the locations to form the click points.

Figure 3:
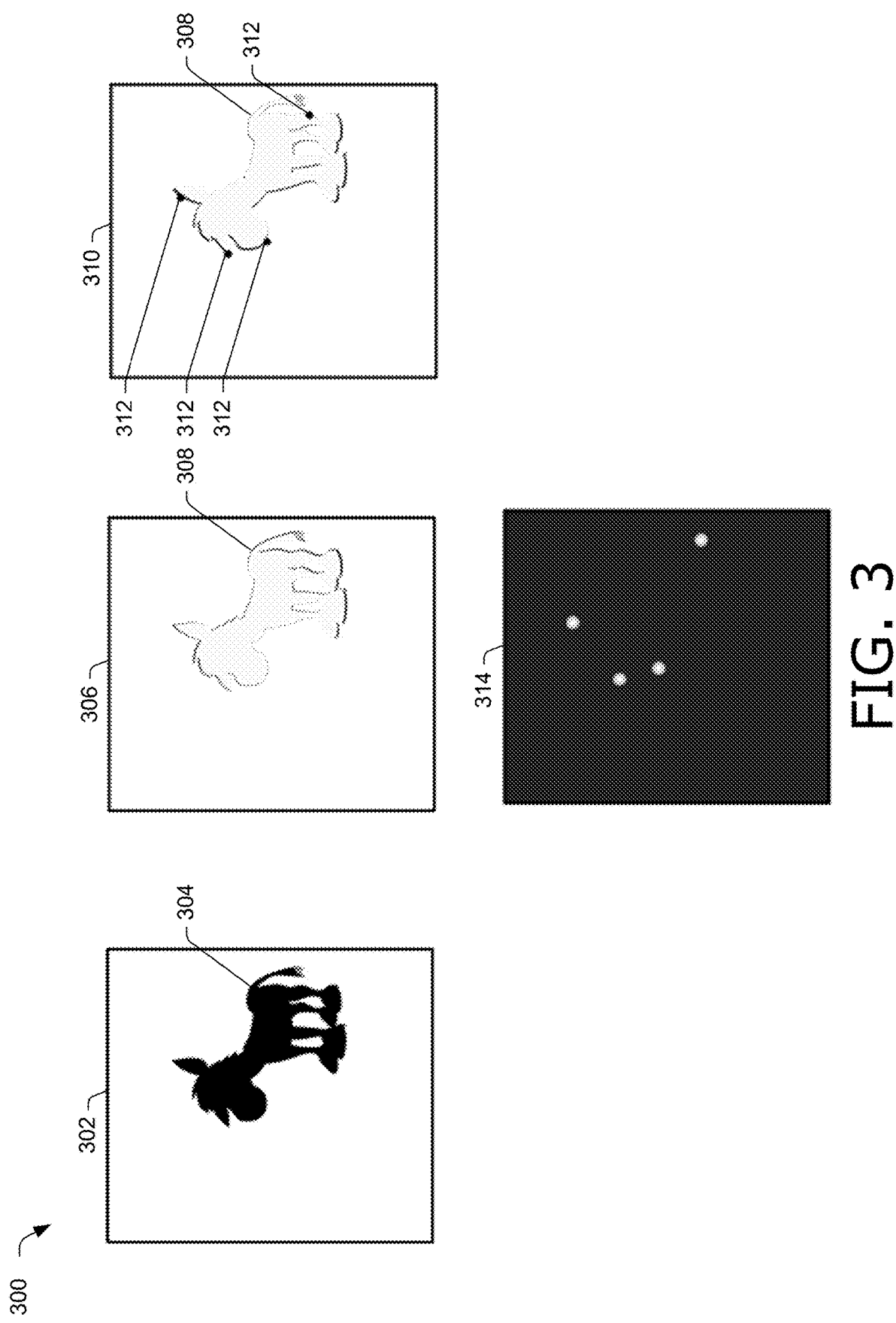
FIG. 3 illustrates example images usable for generating click points in accordance with one or more aspects of the disclosure.

For example, FIG. 3 illustrates example images 300 usable for generating click points in accordance with one or more aspects of the disclosure. Images 300 includes a mask image 302 that includes a mask 304 of an object (e.g., an animal). For instance, the pixels belonging to the object and the mask 304 are colored black in the mask image 302, and pixels colored white of the mask image 302 do not belong to the object or the mask 304. The mask 304 can be a ground truth mask of the object, in which the pixels that belong to the object and are included in the mask are known.

The point selection module 202 can apply an edge filter, such as a Canny edge detector filter, to the mask 304 to form a polyline that represents a boundary or outline of the object depicted by mask 304. In one example, the point selection module 202 applies an RDP algorithm to the polyline to reduce the number of line segments making up the polyline, and stores the endpoints of the line segments in an edge list that represents the polyline. For instance, the edge list may store coordinate locations (e.g., Cartesian coordinates) of endpoints of the line segments making up the polyline. Image 306 depicts a polyline 308 generated by point selection module 202, and the polyline 308 corresponds to the mask 304.

The point selection module 202 can generate click points based on the polyline 308 by determining a random integer $\mathbb{N}$, such as $\mathbb{N}=3\ldots 6$, and assigning $\mathbb{N}$ random locations on the polyline 308. In one example, the $\mathbb{N}$ random locations on the polyline 308 are evenly spaced, with a random starting point on the polyline 308. The point selection module 202 can then randomly jitter the locations to form click points. The amount of jitter can depend on the size of the polyline 308, such as the area contained by the polyline 308, the length of the perimeter of the polyline 308, the height of the polyline 308, the width of the polyline 308, combinations thereof, and the like. Hence, point selection module 202 may jitter locations on a polyline encompassing a larger area more than locations on a polyline encompassing a smaller area.

In one example, the point selection module 202 jitters locations on a polyline to form click points for the polyline by constraining the click points that are jittered to remain on the polyline. For example, the point selection module 202 can jitter the locations along a line segment of the polyline to form the click points. Additionally or alternatively, the point selection module 202 can jitter locations on a polyline to form click points for the polyline by allowing the click points that are jittered to stray off the polyline. For instance, the point selection module 202 can jitter the locations in a random direction without regards to the position and direction of line segments of the polyline. Additionally or alternatively, the point selection module 202 can jitter the locations in a random direction that is weighted by the position and direction of a line segment of the polyline, so that the click points can remain close to the polyline (e.g., within a threshold number of pixels of the polyline, such as within ten pixels of the polyline), without being constrained to be on the polyline.

Image 310 depicts the polyline 308 with click points 312 generated by point selection module 202. Point selection module 202 can generate the click points 312 at any suitable time. In one example, point selection module 202 generates click points during training of object segmentation system 106. For instance, point selection module 202 can generate a different set of click points for each vector graphics image used as training input to system 200 or the object segmentation system 106. Hence, since the click points used for training can be different at each iteration of the training, the point selection module 202 provides a persistence of excitation in the training data, which can result in a better setting of the trained system. For example, because of the persistence of excitation, the convolutional weights of system 200 or object segmentation system 106 trained with click points generated by the point selection module 202 may achieve better performance (e.g., lower loss), compared to conventional systems that may re-use training data and thus do not provide a persistence of excitation. Moreover, the point selection module 202 can generate click points "on the fly" during training of system 200 or object segmentation system 106, automatically and without user intervention.

Image 314 depicts a heat map based on the click points 312 that can be used to train object segmentation system 106. For example, heat map module 208 may receive the click points 312 from point selection module 202 and generate the heat map of image 314. The object segmentation system 106 may use the heat map of image 314 to generate a mask of the object (e.g., the animal), which can be compared to the ground truth mask 304 to evaluate a loss function or gradient of a loss function, and form an error term. The error term can be used as a training update to adjust convolutional coefficients of the object segmentation system 106 in an iterative manner (discussed below in more detail).

Returning to FIG. 2, the point selection module 202 can represent the click points in any suitable way, such as with Cartesian coordinates, polar coordinates, index numbers (e.g., pixel numbers), combinations thereof, and the like. The point selection module 202 can provide click points to region of interest module 206 and heat map module 208. Data used by or calculated by point selection module 202 can be stored in storage 132 in FIG. 1, and be made available to the modules of system 200.

Dataset generation module 204 can be implemented to obtain an image including vector graphics. Dataset generation module 204 can obtain a vector graphics image that can be used to train system 200, such as by obtaining the image from a database of vector graphics images (e.g., a database of images maintained by server 122 and stored at assets 124 in FIG. 1). Additionally or alternatively, dataset generation module 204 can generate a vector graphics image that can be used to train system 200. Dataset generation module 204 can generate a vector graphics image in any suitable way. In one example, dataset generation module 204 generates a vector graphics image by combining vector graphics objects corresponding to a foreground theme and a vector graphics background corresponding to a background theme to form a vector graphics image (e.g., an image represented by vector graphics).

Figure 4:
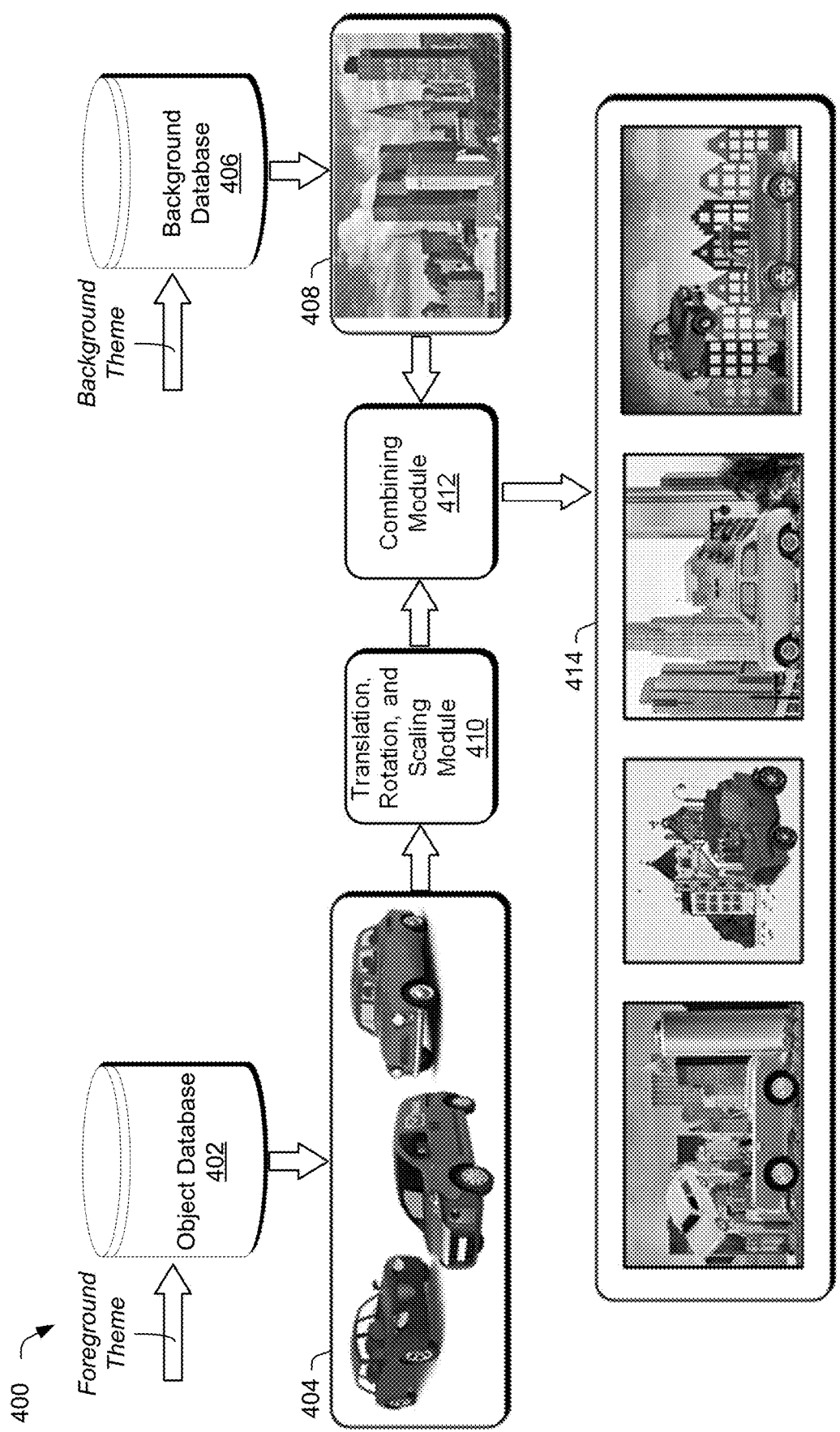
FIG. 4 illustrates an example system usable for generating training datasets of images in accordance with one or more aspects of the disclosure.

FIG. 4 illustrates an example system 400 usable for generating training datasets of images in accordance with one or more aspects of the disclosure. System 400 is an example of a system that can be included in dataset generation module 204 in FIG. 2 to generate a vector graphics image. System 400 includes object database 402 that maintains vector graphics objects, such as vector graphics objects 404, and background database 406 that maintains vector graphics backgrounds, such as vector graphics background 408. Object database 402 and background database 406 are examples of object database 134 and background database 136 in FIG. 1, respectively.

The object database 402 can be addressed by one or more foreground themes, which classify vector graphics objects. Examples of foreground themes include buildings, cars, jungle, nature, office, people, sealife, and village. Hence, the object database 402 may group vector graphics objects based on a foreground theme, such as by grouping vector graphics objects that include or are related to automobiles under the foreground theme "cars". For instance, the object database 402 may append the foreground theme to metadata of the vector graphics objects in the object database 402. In the example in FIG. 4, the vector graphics objects 404 returned by the object database 402 depict images of objects including cars responsive to the object database 402 being addressed with the foreground theme "cars". The number of vector graphics objects 404 returned by object database 402 can be a default value (e.g., ten), or a user-specified value. For instance, prior to training the object segmentation system 106, a user may load a configuration file into system 400 that instructs the system 400 to generate vector graphics images for training that include a specified number of vector graphics objects in the generated vector graphics images. The system 400 may then run automatically and without user intervention in a training mode to generate vector graphics images containing the specified number of vector graphics objects.

The background database 406 can be addressed by a background theme, which classifies a vector graphics background. Examples of background themes include city, people, nature, sealife, village, and office. Hence, the background database 406 may group vector graphics backgrounds based on a background theme, such as by grouping vector graphics backgrounds that include or are related to metropolitan cities under the background theme "city". For instance, the background database 406 may append the background theme to metadata of the vector graphics background in the background database 406. In the example in FIG. 4, the background database 406 is addressed with the foreground theme "city", so that the vector graphics background 408 returned by the background database 406 depicts an images of a city skyline.

Though the object database 402 and the background database 406 are depicted as separate databases in FIG. 4, system 400 can combine the object database 402 and the background database 406 into a single database that can be addressed by foreground themes and background themes. In one example, the combined database can be addressed simultaneously with one or more foreground themes and one or more background themes.

System 400 also includes translation, rotation, and scaling module 410 and combining module 412. Translation, rotation, and scaling module 410 receives vector graphics objects 404 and can apply one or more of a translation, a rotation, or a scaling to one or more of the vector graphics objects. Translation refers to a positional movement of a vector graphics object, such as by assigning a position on a vector graphics image at which a vector graphics object is to be placed. Rotation refers to angular rotation about a vector graphic object's center. Hence, a vector graphics object may be placed on a vector graphics image at an angle relative to a reference angle, such as at 45 degrees relative to a horizon line. Scaling refers to setting a size of a vector graphics object that is placed on a vector graphics image. For instance, translation, rotation, and scaling module 410 may set the size of a vector graphics object based on a percentage of a horizontal or vertical dimension (or both dimensions) of a vector graphics image on which the vector graphics object is placed. By limiting the scaling factor to be 100% or less, the vector graphics object can be placed at a position of the vector graphics image so that the object is fully contained in the vector graphics image.

In one example, the translation, rotation, and scaling module 410 randomly sets one or more of the translation, rotation, or scaling of vector graphics objects. For instance, the translation may be set to a random position within a vector graphics image. The random position may be constrained to be within a bounding region that occupies a portion of the vector graphics image, such as a rectangular or circular region centered within the vector graphics image. The rotation may be randomly set to an angle within a range, such as within [0, π] or [0, π] radians. The random scaling may be set to a random scale factor within a range of scale factors, such as between 20% and 40% of a horizontal dimension of a vector graphics image.

Combining module 412 combines the vector graphics objects from the translation, rotation, and scaling module 410 with the vector graphics background 408 by placing the vector graphics objects on the vector graphics background 408 according to the translation, rotation, and scaling set by the translation, rotation, and scaling module 410. Images 414 are examples of vector graphics images output by the combining module 412 and generated by the system 400. The images 414 include vector graphics objects corresponding to a "cars" foreground theme overlaid on vector graphics backgrounds corresponding to a "city" background theme. For instance, the images 414 can be generated according to the function call to the system 400 of city: [Cars] to combine vector graphics objects belonging to a "cars" foreground theme with a vector graphics background corresponding to a "city" background theme. Hence, the images 414 can include cars at various positions (e.g., appearing to fly) against a city background. Since the system 400 places the vector graphics objects within the images 414 at known positions, rotations, and sizes, the system 400 can store ground truth masks for each of the objects in the images 414. The ground truth masks define regions of the images 414 occupied by the vector graphics objects, and can be used to train an object segmentation system, such as object segmentation system 106.

Table 1 depicts pseudocode of an algorithm that can be implemented by system 400 to generate a dataset of vector graphics images. The blend function merges vector graphics objects of foreground themes onto a vector graphics background on the basis of Cartesian coordinates, and generates ground truth masks for the vector graphics objects.

TABLE 1

Pseudocode to Generate Images For Training

```
def generate_image (fg_set, bg_set, fg_themes, compatible_map):
  bg_set.shuffle( )
  bg_image = bg set[0]
  Fg_images, masks = [ ], [ ]
  for i in random.randint(10,20):
    fg_themes.shuffle ( )
    if fg_themes[ ] in compatible_map [bg_image.theme]:
      fg_set [fg_themes[0]].shuffle( )
      fg_images.append(fg_set[fg_themes[0]][0])
  fg_images.shuffle( )
  for i in fg_images:
    x = random.randint(bg_image.width)
    y = random.randint(bg_image.height)
    bg_image, mask = blend(I, bg_image, x, y)
    masks.append(mask)
  return bg_image, masks
```

Returning again to FIG. 2, the dataset generation module 204 can provide images with ground truth masks of vector graphics objects in the images to point selection module 202, region of interest module 206, path mapping module 214, and training module 216. Data used by or calculated by dataset generation module 204 can be stored in storage 132 in FIG. 1, and be made available to the modules of system 200.

Heat map module 208 can be implemented to generate a heat map from the click points provided by point selection module 202. Heat map 222 is an example of a heat map generated by heat map module 208, and corresponds to the click points 220 on the image 218. In one example, heat map module 208 generates a heat map that has a same size (e.g., same number of pixels and same aspect ratio) as a rasterized region generated by rasterization module 210. Hence, the heat map may be representative of the rasterized region.

Heat map module 208 can generate a heat map in any suitable way. In one example, heat map module 208 generates a heat map by applying a Gaussian separately to each of the click points by centering the Gaussian kernel at each of the click points. For instance, a click point corresponds to the mean of the Gaussian kernel. The variance of the Gaussian kernel varies the intensity of the heat map radially from respective centers of the click points, and can be set in any suitable way, such as to ten.

The heat map module 208 can provide a heat map to mask generation module 212. Data used by or calculated by heat map module 208 can be stored in storage 132, accessed as heat map data 142 in FIG. 1, and be made available to the modules of system 200.

Region of interest module 206 can be implemented to determine a region of interest in an image that includes an object based on points that identify the object. Region of interest module 206 can receive click points from point selection module 202, and a vector graphics image for which the click points are obtained, such as a user-supplied image from point selection module 202 or an image for training system 200 from dataset generation module 204. Based on the click points, region of interest module 206 can determine a region of interest by determining a rectangular region of vector graphics content of the image. The region of interest module 206 can determine the rectangular region so that all of the click points are contained within the rectangular region, and then inflate the rectangular region by an amount, such as by a percentage (e.g., 10% of the rectangular region in each of horizontal and vertical dimensions). The region of interest module 206 can set the inflated rectangular region as the region of interest, which includes vector graphics content of the image 218 corresponding to the region of interest. Additionally or alternatively, region of interest module 206 can determine the rectangular region so that the center of mass of the area inside a boundary formed by the click points is at the center of the rectangular region.

The region of interest module 206 provides the region of interest, including the vector content of the image within the region of interest, to rasterization module 210, which can be implemented to rasterize the vector content of the region of interest to form a rasterized region. In one example, rasterization module 210 rasterizes a region of interest to generate a rasterized region that has a same size (e.g., same number of pixels and same aspect ratio) as a heat map generated by heat map module 208, such as 512×512 pixels. Region of interest 224 is an example of a rasterized region generated by rasterization module 210, and corresponds to the click points 220. Hence, region of interest 224 includes the rasterized vector graphics of the car's wheel from image 218. By using the region of interest 224, rather than rasterizing the vector graphics of the entire image 218, system 200 can focus on the portion of the image 218 indicated by the click points 220, and allows the designer to work at an arbitrary resolution.

Rasterization module 210 can rasterize vector content of a region of interest to generate a rasterized region using any suitable rasterization algorithm, such as a triangle rasterization algorithm that breaks polygons into triangles, or a scanline rasterization for line-by-line rasterization. In one example, rasterization module 210 rasterizes vector content with Bresenham's line algorithm that uses an incremental error algorithm to determine line primitives, so that mathematical operations reduce to integer addition, subtraction and bit shifting, which can be efficiently implemented with two's complement numerical representations.

Rasterization module 210 provides a rasterized region, such as region of interest 224, to mask generation module 212. Data used by or calculated by region of interest module 206 and rasterization module 210 can be stored in storage 132, accessed as region of interest data 144 in FIG. 1, and be made available to the modules of system 200.

Mask generation module 212 receives a heat map from heat map module 208 and a rasterized region from rasterization module 210, and can be implemented to generate an object mask from the rasterized region and the heat map. The mask can identify pixels in the rasterized region belonging to the object. Mask image 226 depicts a mask for the tire in region of interest 224 corresponding to the click points 220, and includes white pixels corresponding to the tire and black pixels that do not correspond to the tire. The mask image 226 can be generated by the mask generation module 212.

Mask generation module 212 can generate a mask of an object in any suitable way. In one example, mask generation module 212 includes a neural network that generates an object mask from a heat map and a rasterized region, such as a neural network that includes an encoder and a decoder. An example of a neural network of mask generation module 212 that includes an encoder and a decoder is illustrated in FIG. 5.

Figure 5:
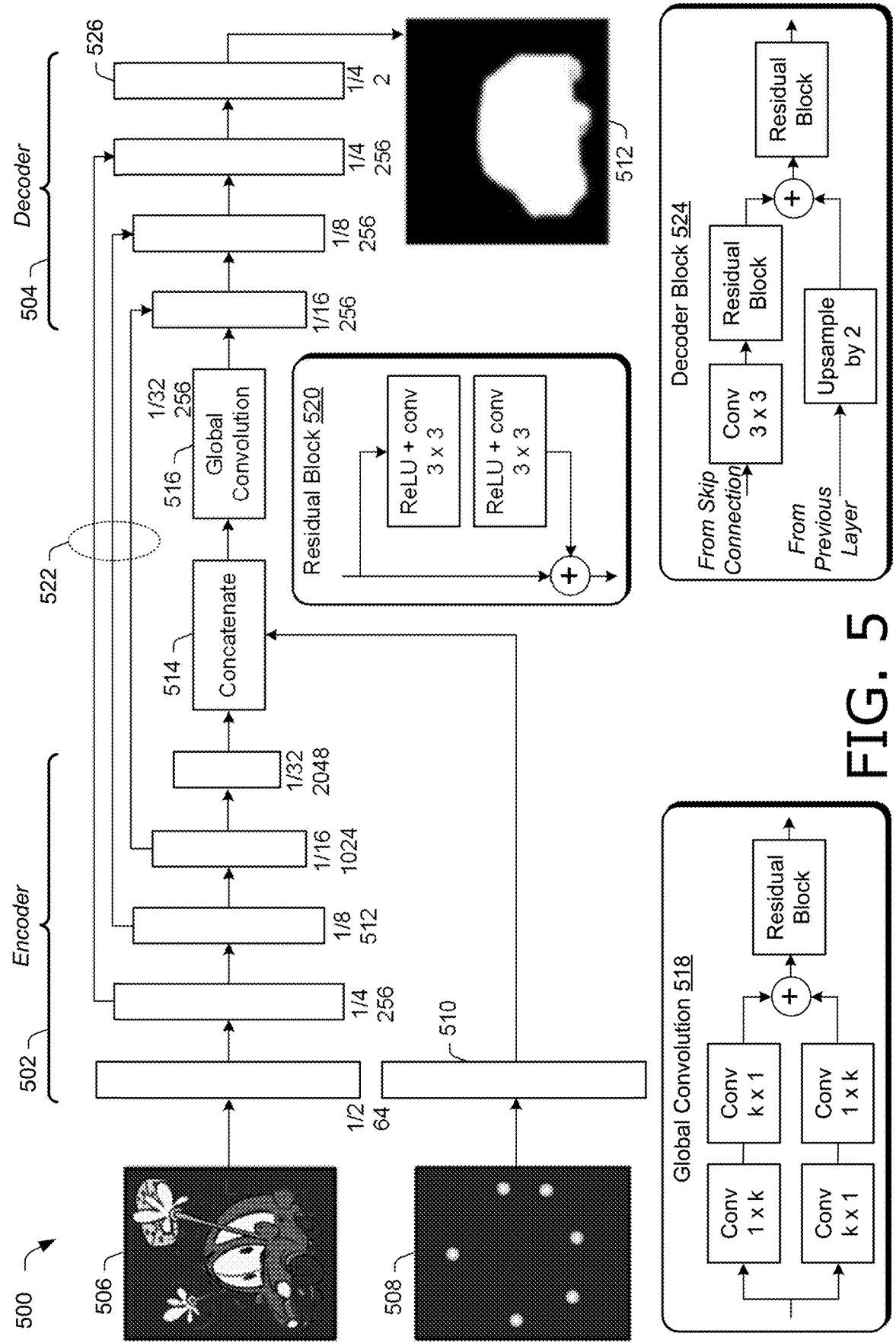
FIG. 5 illustrates an example neural network in accordance with one or more aspects of the disclosure.

FIG. 5 illustrates an example neural network 500 in accordance with one or more aspects of the disclosure. Neural network 500 is an example of a neural network of mask generation module 212 that can be implemented to generate a mask of an object based on a heat map from heat map module 208 and a rasterized region from rasterization module 210. Neural network 500 includes an encoder 502 and a decoder 504. Rasterized region 506 is an example of a rasterized region generated by rasterization module 210, and heat map 508 is an example of a heat map generated by heat map module 208. Neural network 500 provides the rasterized region 506 to encoder 502, and the heat map 508 to layer 510, and generates mask image 512.

The encoder 502 includes a series of layers that progressively downsample and can perform convolutions. The encoder 502 can be based on a pre-trained ResNet50 architecture with pooling layers removed. The downsample factor of layers of encoder 502 can be any suitable factor, and is set to two in the example in FIG. 5. Convolutions in encoder 502 can be performed in any suitable way, such as with 3×3 or 4×4 spatial filters with stride 2. Stride refers to an amount a filter is shifted for each calculation of a convolution or deconvolution. Each layer of encoder 502 generates a feature map having a number of channels corresponding to the number of convolutional filters in the layer. The rate relative to the rasterized region 506 and number of channels for each layer of encoder 502 are illustrated underneath each respective layer. For instance, the first layer of encoder 502 that receives rasterized region 506 has a rate of ½ and 64 channels.

Neural network 500 also includes layer 510 that receives the heat map 508. Layer 510 can be a convolutional layer having a same architecture as the first layer of encoder 502 that receives the rasterized region 506. To determine the convolutional coefficients of layer 510, neural network 500 can initialize the coefficients in any suitable way, and adjust the coefficients based on training updates provided by training module 216. In one example, neural network 500 initializes the coefficients of layer 510 based on a He initialization described in *Deep Residual Learning for Image Recognition* in arXiv:1512.03385v1, Dec. 10, 2015 by Kaiming He et al.

Neural network 500 also includes concatenate block 514 that concatenates a feature map generated by encoder 502 with the output of layer 510, such as along the channel dimension, and provides the result of the concatenation to global convolution 516. The global convolution 516 can perform global feature matching between the region of interest and heat map streams, and an example of global convolution 516 is illustrated at global convolution 518. The global convolution 518 efficiently enlarges the result of the concatenation by combining (1×k)+(k×1) and (k×1)+(1×k) convolution layers. The parameter k of the convolution layers can be set in any suitable way, such as to seven. The global convolution 518 includes a residual block to process the results of the combining of the convolutional layers. An example of a residual block is illustrated at residual block 520, which includes blocks with rectified linear units (ReLU) and 3×3 convolutions. In one example, the number of convolution filters is set to 256, so that the residual block generates a feature map having 256 channels.

Neural network 500 provides the output of global convolution block 516 to decoder 504, which includes a series of refinement layers that can progressively upsample by a factor corresponding to the downsample factor of encoder 502, such as a factor of two. The number of channels of the refinement layers is set to 256. The refinement layers of the decoder 504 also receive skip connections 522 from the encoder 502. The skip connections 522 bypass the concatenate block 514 and global convolution 516 and can directly connect the refinement layers of the decoder 504 with respective layers of the encoder 502. The skip connections 522 allow the neural network 500 to efficiently merge features in different scales. For instance, the decoder block 524 is an example of a refinement layer that receives skip connections in the decoder 504.

The decoder block 524 receives a skip connection from encoder 502 and an input from a previous layer, such as a previous layer of decoder 504. The decoder block 524 processes the skip connection with a 3×3 convolutional filter and a residual block, and sums the result with an upsampled version of the input from the previous layer. The result of the summing is processed by another residual block. The residual block 520 as discussed above is an example of the residual blocks of the decoder block 524. By using residual blocks within the refinement layers of the decoder 504, the layers of the decoder 504 can effectively implement skip connections within the refinement layers, in addition to the skip connections 522 from the encoder 502.

In addition to the refinement layers that receive skip connections form the encoder 502, the decoder 504 can also include layer 526 that can perform a final convolution, softmax, binarization, or combinations thereof to generate the mask image 512. For example, the layer 526 can perform 3×3 convolutions and a softmax operation that generates a respective probability that each pixel of the rasterized region 506 belongs to the object mask. The layer 526 can also implement a binarization by applying a threshold probability as part of the softmax operation. For instance, a pixel with a probability greater than the threshold probability, such as 0.85, may be assigned a white value and included in the mask of the object, and a pixel with a probability not greater than the threshold probability may be assigned a black value and excluded from the mask of the object. In the example in FIG. 5, the mask image 512 depicts the object corresponding to the car in the rasterized region 506 and whose boundary is denoted by the heat map 508 with white pixels. Pixels not corresponding to the car are denoted as black pixels in the mask image 512.

To determine convolutional coefficients of the decoder 504, such as coefficients of refinement layers, coefficients of layer 526, or combinations thereof, the neural network 500 can initialize the coefficients in any suitable way. Decoder 504 can then iteratively adjust the coefficients based on training updates provided by training module 216 (discussed below in more detail).

Returning again to FIG. 2, the mask generation module 212 can provide object masks to path mapping module 214 and training module 216. Data used by or calculated by mask generation module 212 can be stored in storage 132 in FIG. 1, accessed as mask data 146, and be made available to the modules of system 200.

Path mapping module 214 can be implemented to receive a mask from mask generation module 212 (e.g., on object mask) and a vector graphics image that includes the object, and determine paths of the vector graphics in the image that correspond to the object. Path mapping module 214 can determine paths of the vector graphics corresponding to the object in any suitable way. In one example, path mapping module 214 can determine a polyline corresponding to the mask, the polyline representing a boundary or outline of the mask, and use the polyline as a predicate for containment. For instance, the path mapping module 214 can operate in one of a full containment mode or a partial containment mode. When in the full containment mode, the path mapping module 214 can determine the paths of the vector graphics as visible paths according to a z-order of the paths that are contained in the polyline. When in the partial containment mode, the path mapping module 214 can determine the paths of the vector graphics as visible paths according to a z-order of the paths that intersect the polyline or any point interior to the polyline. The paths of the vector graphics representing the object can then be edited by a designer, such as by changing a color of the object, or changing a parameter of a Bezier curve to imply motion of the object in an animation. For instance, the mask of the object may be included in an image that is part of an animation sequence of images.

Table 2 depicts pseudocode of an algorithm that can be implemented by path mapping module 214 to determine paths of vector graphics objects. The pseudocode of Table 2 uses Boolean operations on paths, which are available in nearly all vector graphics editing applications, such as Adobe Illustrator®. Full containment mode in Table 2 is denoted by the variable FULL, and partial containment mode in Table 2 is denoted by the variable PART.

TABLE 2

Pseudocode to Determine Vector Graphics Paths from an Object Mask

```
def select_paths (orig_mask, paths, mode) :
   mask = orig_mask.copy ( )
   selection = [ ]
   for path in reverse_z_order (paths) :
      if intersection (path,mask) is not null:
         if mode = = FULL and union(path,orig_mask) = = orig_mask :
            mask = = mask − area(intersection(mask, path))
```

TABLE 2-continued

Pseudocode to Determine Vector Graphics Paths from an Object Mask

```
         selection.append(path)
      else if mode = = PART :
         mask = mask − area (intersection(mask,path))
         selection.append(path)
      if mask is null:
         break
   return selection
```

The path mapping module 214 can provide the paths of the vector graphics representing the object to a vector graphics editing application, such as Adobe Illustrator®, allowing a designer to edit the object in any suitable way. Data used by or calculated by path mapping module 214 can be stored in storage 132 in FIG. 1, accessed as object path data 148, and be made available to the modules of system 200.

Training module 216 can be implemented to provide training updates to system 200. Hence, the training module 216 can receive an image including an object represented by vector graphics, such as a training image generated by dataset generation module 204. The training image can include a ground truth mask of the objects included in the training image. A ground truth mask can denote a region of the image known to correspond to an object in the image, such as by denoting pixels known to correspond to an object and pixels known to not correspond to an object.

The training module 216 can also receive the mask of an object generated by mask generation module 212. The mask can include a binary value for each pixel that denotes whether the pixel belongs to the object of the mask or not. In one example, the mask also includes a probability for each pixel that denotes a probability that the pixel belongs to the object mask. The binary values can be determined from the probabilities, such as by applying a threshold probability to each of the probabilities. For instance, a pixel with a probability greater than the threshold probability, such as 0.85, may be assigned to the mask of the object, and a pixel with a probability not greater than the threshold probability may not be assigned to the mask of the object.

The training module 216 can use a ground truth mask of a training image and a mask generated by the mask generation module 212 to determine coefficients (e.g., convolutional coefficients of an encoder, decoder, convolutional layer, residual block, global convolution, or combinations thereof) to optimize a cost function. For instance, the training module 216 may determine the coefficients that minimize a loss function, maximize a gain function, or combinations thereof. In one example, the training module 216 determines convolution coefficients of at least one of an encoder, decoder, convolutional layer, or refinement layer of mask generation module 212 that minimize a loss function that includes a foreground loss term and a background loss term. The foreground loss term can encourage, via the optimization, inclusion of the pixels of the object in the mask, and the background loss term can discourage, via the optimization, inclusion in the mask of additional pixels not of the object. An example of a loss function that can be minimized by training module 216 is $$\mathcal{L} = \alpha \cdot \mathcal{L}_{FG} + \beta \cdot \mathcal{L}_{BG} \text{ where}$$

$$\mathcal{L}_{FG} = \sum_{i=1}^{N} \sum_{j=1}^{M} y_{ij} \cdot \log[\sigma(x_{ij}^{FG})] + (1 - y_{ij}) \cdot \log[\sigma(x_{ij}^{FG})] \text{ and}$$

$$\mathcal{L}_{BG} = \sum_{i=1}^{N} \sum_{j=1}^{M} (1 - y_{ij})\log[\sigma(x_{ij}^{BG})] + y_{ij} \cdot \log[\sigma(x_{ij}^{BG})].$$

The parameter N denotes a number of masks generated by mask generation module 212 at different scales, such as masks generated from different layers of a decoder. For instance, outputs of refinement layers of decoder 504 in FIG. 5 may produce outputs at different scales and be supplied to one or more layers that binarize the outputs, such as layer 526. In one example, the parameter N is set to four.

The parameter M denotes the number of pixels in a mask. The parameters $y_{ij}$, $x_{ij}^{FG}$, and $x_{ij}^{BG}$ denotes the ground truth mask, foreground prediction, and background prediction, respectively. In one example, the foreground prediction and the background prediction are taken from binary values of masks generated by mask generation module 212. Hence, the loss function may compute a binary cross-entropy logit loss. Additionally or alternatively, the foreground prediction and the background prediction can be taken from probabilities of pixels belonging to masks generated by mask generation module 212. The function $\sigma(\cdot)$ denotes a sigmoid function. The parameters $\alpha$ and $\beta$ denote combining weights and can be set in any suitable way. In one example, the parameters $\alpha$ and $\beta$ are within the range [0, 1] and are set according to $\beta=(1-\alpha)$. For instance, the parameters $\alpha$ and $\beta$ may both be set to ½.

By including both a foreground loss term and a background loss term, the system 200 can prevent hallucinations which introduce into a segmented object of an image undesired artifacts not present in the image. In contrast, systems that rely on loss functions having only a foreground loss term and no background loss term are prone to introducing undesired artifacts to the masks of segmented objects, such as by adding a tail to a rabbit when the rabbit does not include a tail.

The training module 216 can minimize the loss function in any suitable way, such as by iteratively updating coefficients of the mask generation module 212 according to a gradient descent. For instance, the training module 216 may update a coefficient c according to $c_{k+1}=c_k-\mu \cdot \nabla \mathcal{L}(c_k)$, where $\nabla$ denotes the gradient of the loss function $\mathcal{L}$ and k denotes an iteration index. The parameter $\mu$ denotes a stepsize of the iterative training and can be set to any suitable value, such as a small number less than one, e.g., $10^{-3}$.

Training updates provided by training module 216 to mask generation module 212 can include any suitable data to update the coefficients of the mask generation module 212, such as an updated coefficient (e.g., $c_{k+1}$). In one example, training updates provided by training module 216 to mask generation module 212 include an error term corresponding to the gradient of the loss function, $\nabla \mathcal{L}(c_k)$. Additionally or alternatively, the training updates can include the gradient of the loss function multiplied by the stepsize $\mu$. Data used by or calculated by training module 216 can be stored in storage 132 in FIG. 1, accessed as training data 150, and be made available to the modules of system 200.

The systems described herein constitute an improvement over conventional object segmentation systems that do not account for user intent, or require user inputs that make it difficult or impossible to segment objects in vector graphics. In contrast, the systems described herein account for user intent by receiving user inputs consisting of a limited number of click points. The click points are not required to be precisely on a boundary of an object, and instead can be a number of pixels off from the boundary of an object. Moreover, the systems described herein focus on a region of interest of an image that is based on the click points, and therefore necessarily includes the object to be segmented. Accordingly, the systems described herein accurately segment objects of vector graphics images, even when objects are occluded or share a boundary. Moreover, the systems described herein are easy and efficient to operate, unlike conventional systems that account for user intent.

Furthermore, the systems described herein constitute an improvement over conventional systems that rely on loss functions made up of foreground loss terms without background loss terms. In contrast, the systems described herein can be trained according to a loss function made up of a combination of a foreground loss term and a background loss term, preventing hallucinations common to conventional systems.

Moreover, the systems described herein can generate vector graphics images during training, by randomly combining vector graphics objects from one or more foreground themes with a vector graphics background from a background theme, resulting in virtually an infinite number of training images. The systems described herein can also generate click points that simulate a user input. The simulated click points can also be generated during training according to one or more random variables, resulting in virtually an infinite number of click points and associated heat maps for training. Accordingly, the systems described herein include a persistence of excitation in the training dataset that is simply not possible with conventional systems that rely on user annotation or a limited number of training images for training. Because of the persistence of excitation, the systems described herein can be trained to achieve a setting of a neural network that has superior performance in terms of loss functions compared to conventional systems.

Example Procedures

Figure 6:
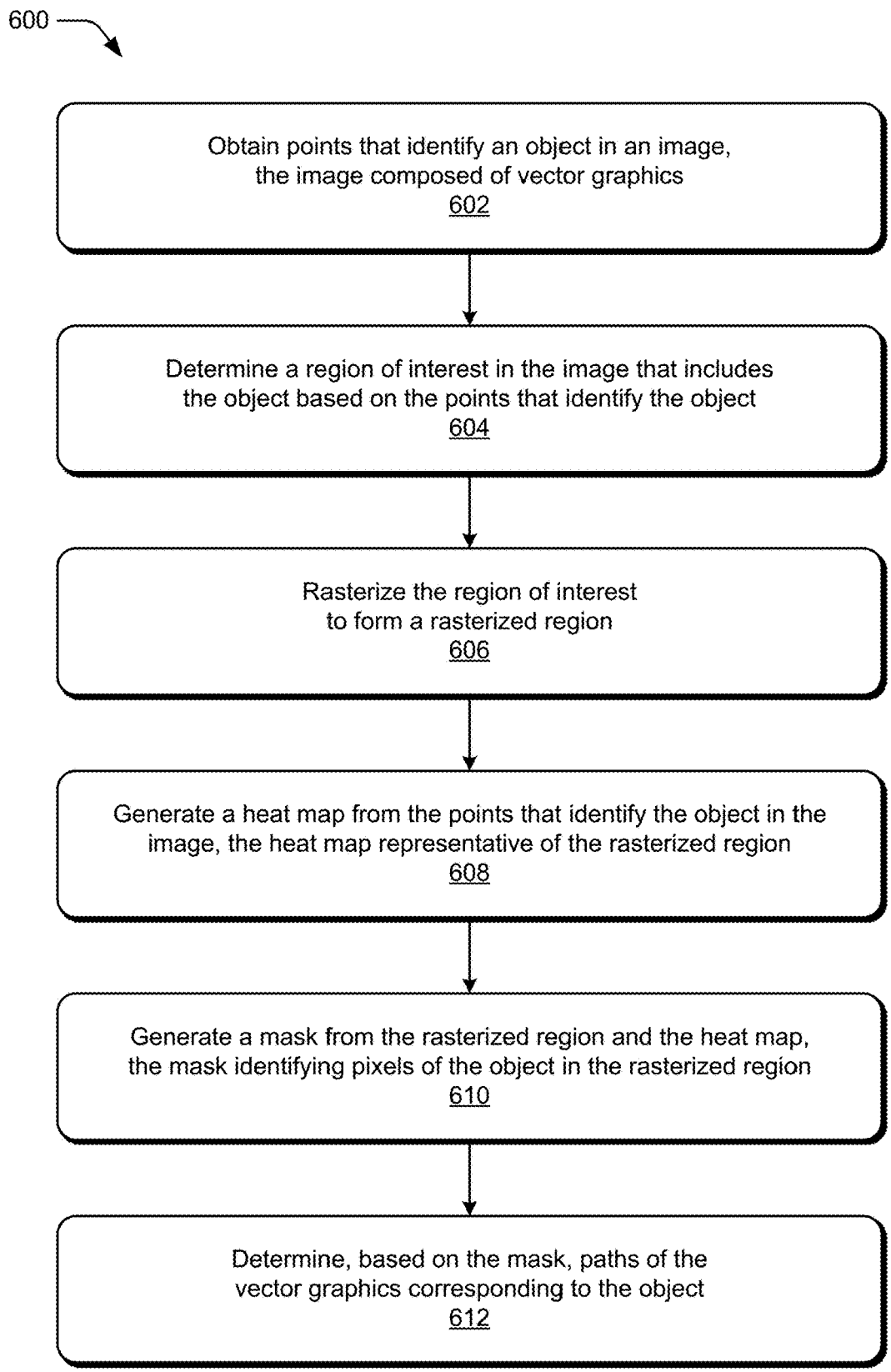
FIG. 6 illustrates a flow diagram depicting an example procedure in accordance with one or more aspects of the disclosure.

FIG. 6 illustrates an example procedure 600 for segmenting objects in vector graphics images in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 122 of FIG. 1 that makes use of an object segmentation system, such as system 200 or object segmentation system 106. An object segmentation system implementing procedure 600 may be an independent application that has been installed on the computing device, a service hosted by a service provider that is accessible by the computing device, a plug-in module to the computing device, or combinations thereof.

Points that identify an object in an image are obtained, the image composed of vector graphics (block 602). For instance, point selection module 202 can obtain points that identify an object in a vector graphics image. In one example, point selection module 202 obtains the points that identify the object in the image by receiving the points that identify the object in the image as user inputs designating the points as a boundary of the object. Additionally or alternatively, point selection module 202 can obtain the points that identify the object in the image by determining a ground truth mask of the object and determining random locations on a border of the ground truth mask. The point selection module 202 can then randomly jitter the random locations to generate the points that identify the object.

A region of interest in the image that includes the object is determined based on the points that identify the object (block 604). Region of interest module 206 can determine a region of interest in the image that includes the object based on the points that identify the object. In one example, region of interest module 206 determines a rectangular region of the image that contains the object, and the region of interest is determined based on the rectangular region, such as by setting the region of interest to the rectangular region, or inflating the rectangular region in at least one of horizontal or vertical dimensions by a percentage of at least one of the horizontal or vertical dimensions to form the region of interest.

The region of interest is rasterized to form a rasterized region (block 606). Rasterization module 210 can rasterize the region of interest to form a rasterized region. A heat map is generated from the points that identify the object in the image (block 608). The heat map can be representative of the rasterized region. For instance, heat map module 208 can generate a heat map from the points that identify the object in the image, the heat map having a same size (e.g., same resolution) as the rasterized region and representing a same portion of the image as the rasterized region. In one example, heat map module 208 generates the heat map by applying a Gaussian kernel to the points that identify the object in the image. The mean of the Gaussian kernel can be centered at the points, and the variance of the Gaussian kernel can vary the intensity of the heat map radially from each of the points.

A mask is generated from the rasterized region and the heat map, the mask identifying pixels of the object in the rasterized region (block 610). For instance, mask generation module 212 can generate a mask from the rasterized region and the heat map, the mask identifying pixels of the object in the rasterized region. In one example, mask generation module 212 generates the mask by generating a feature map with an encoder that receives the rasterized region as an input. The mask generation module 212 can filter the heat map and concatenate the feature map with the results of the filtering. The mask generation module 212 can then generate, with a decoder, probabilities the pixels correspond to the object based on results of the concatenating, and apply a probability threshold to the probabilities to form the mask.

Additionally or alternatively, at least one of the encoder or the decoder can include convolutional weights determined from a loss function that combines a foreground loss term and a background loss term. The foreground loss term encourages, via the training, inclusion of the pixels of the object in the mask, and the background loss term discourages, via the training, inclusion in the mask of additional pixels not of the object.

In one example, the mask generation module 212 utilizes an encoder-decoder network to generate the mask based on inputs of the rasterized region and the heat map. The encoder-decoder network can be trained with vector graphics artworks that include objects belonging to classes, and the object in the image does not belong to the classes.

Dataset generation module 204 can generate the vector graphics artworks used to train the encoder-decoder network. The vector graphics artworks can be generated "on the fly" while the encoder-decoder network is trained, rather than storing the vector graphics artworks and retrieving the stored vector graphics artworks during training.

Additionally or alternatively, training module 216 can train an encoder-decoder network of the mask generation module 212 to generate the mask based on inputs of the rasterized region and the heat map. The points that identify the object in the image can be generated by the point selection module 202 while the encoder-decoder network is trained.

Paths of the vector graphics corresponding to the object are determined based on the mask (block 612). Path mapping module 214 can determine, based on the mask, paths of the vector graphics corresponding to the object. In one example, the path mapping module 214 can operate in a full containment mode. For instance, the path mapping module 214 can determine the paths of the vector graphics corresponding to the object by determining the paths as visible paths of the vector graphics that are contained in the mask, such as by determining a polyline corresponding to the mask, the polyline representing an outline of the mask, and determining the paths of the vector graphics corresponding to the object based on visible paths of the vector graphics that are contained the polyline.

Additionally or alternatively, the path mapping module 214 can operate in a partial containment mode. For instance, the path mapping module 214 can determine the paths of the vector graphics corresponding to the object comprises by determining the paths as visible paths of the vector graphics that intersect an interior of the mask, such as by determining a polyline corresponding to the mask, the polyline representing an outline of the mask, and determining the paths of the vector graphics corresponding to the object based on visible paths of the vector graphics that intersect the interior of the polyline. In one example, the path mapping module 214 receives an input to operate in one of the full containment mode or the partial containment mode. The path mapping module 214 can then determine the paths of the vector graphics as one of visible paths that are contained by the polyline in the full containment mode, or as the visible paths that intersect the interior of the polyline in the partial containment mode.

In one example, an object segmentation system implementing procedure 600 receives an input to operate in one of a user mode or a training mode. In the user mode, the object segmentation system can receive user inputs designating the points that identify the object in the image as a boundary of the object. In the training mode, the object segmentation system can determine a ground truth mask of the object, and an edge list of the ground truth mask, the edge list indicating line segments that define a polyline representing a border of the ground truth mask. The object segmentation system can then determine a random number of random locations on the polyline defined by the edge list, and randomly jitter the random locations to form the points.

Additionally or alternatively, when the input indicates the training mode, the object segmentation system can evaluate a loss function that combines a foreground loss term and a background loss term. The foreground loss term encourages inclusion of the pixels of the object in the mask, and the background loss term discourages inclusion in the mask of additional pixels not of the object. The object segmentation system can update at least one coefficient of a filter used to generate the mask, the at least one coefficient of the filter updated based on evaluating the loss function.

FIG. 7 illustrates an example procedure 700 for segmenting objects in vector graphics images in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 122 of FIG. 1 that makes use of an object segmentation system, such as system 200 or object segmentation system 106. An object segmentation system implementing procedure 700 may be an independent application that has been installed on the computing device, a service hosted by a service provider that is accessible by the computing device, a plug-in module to the computing device, or combinations thereof.

A region of interest that includes an object in an image having vector graphics is determined based on points on the image corresponding to a boundary of the object (block 702). Point selection module 202 can obtain the points on the image corresponding to a boundary of the object, and region of interest module 206 can determine the region of interest that includes the object in the image based on the points. In one example, point selection module 202 obtains the points as user inputs designating the points as a boundary of the object. Additionally or alternatively, point selection module 202 can obtains the points by determining a ground truth mask of the object, determining random locations on a border of the ground truth mask, and randomly jittering the random locations to generate the points that identify the object.

The region of interest module 206 can determine the region of interest that includes the object in the image by determining a rectangular region that includes the points on the image corresponding to a boundary of the object, and determining the region of interest based on the rectangular region. In one example, the region of interest module 206 sets the region of interest to be equal to the rectangular region. In another example, the region of interest module 206 inflates the rectangular region by increasing at least one dimension of the rectangular region to form the region of interest.

A heat map is generated from the points by applying a kernel to the points (block 704). Heat map module 208 can generate a heat map from the points by applying a kernel to the points. One example of a kernel is a Gaussian kernel with a mean centered on each of the points. The variance of the Gaussian kernel can radially determine the intensity of the heat map.

A mask of the object is generated from the region of interest and the heat map (block 706). Rasterization module 210 can rasterize the region of interest and form a rasterized region, and mask generation module 212 can generate a mask of the object from the rasterized region and the heat map. In one example, the mask generation module 212 includes an encoder-decoder network to generate the mask based on inputs of the rasterized region and the heat map. The encoder-decoder network can be trained with vector graphics artworks that include objects belonging to classes, and the object in the image does not belong to the classes. Dataset generation module 204 can generate the vector graphics artworks while the encoder-decoder network is trained.

Figure 8:
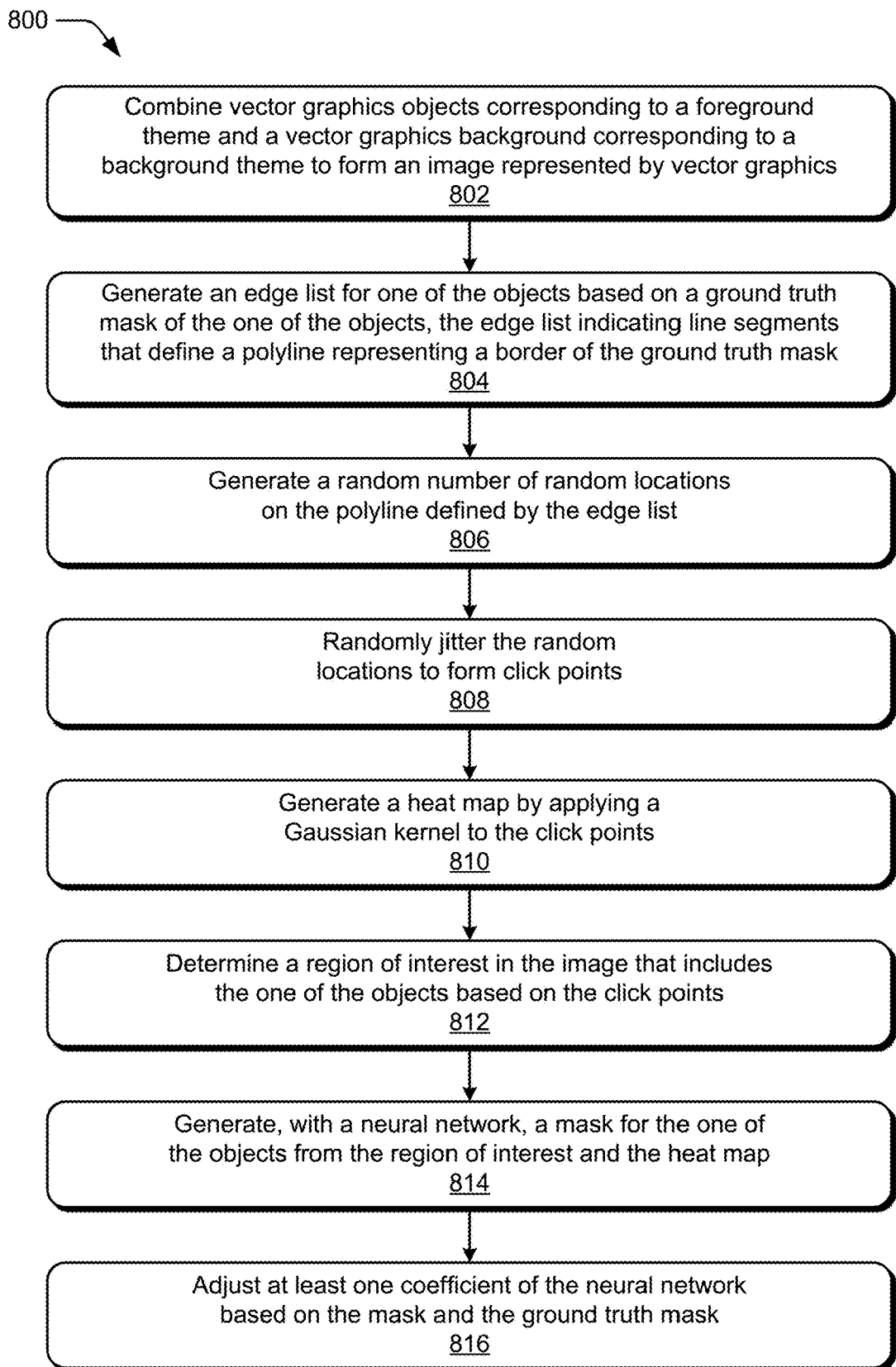
FIG. 8 illustrates a flow diagram depicting an example procedure in accordance with one or more aspects of the disclosure.

FIG. 8 illustrates an example procedure 800 for segmenting objects in vector graphics images in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 122 of FIG. 1 that makes use of an object segmentation system, such as system 200 or object segmentation system 106. An object segmentation system implementing procedure 800 may be an independent application that has been installed on the computing device, a service hosted by a service provider that is accessible by the computing device, a plug-in module to the computing device, or combinations thereof.

Vector graphics objects corresponding to a foreground theme and a vector graphics background corresponding to a background theme are combined to form an image represented by vector graphics (block 802). Dataset generation module 204 can combine vector graphics objects corresponding to a foreground theme and a vector graphics background corresponding to a background theme to form an image represented by vector graphics. The image represented by vector graphics may also be referred to as a vector graphics image or vector graphics artwork.

An edge list for one of the objects is generated based on a ground truth mask of the one of the objects (block 804). The edge list can indicate line segments that define a polyline representing a border of the ground truth mask. Point selection module 202 can generate an edge list for one of the objects based on a ground truth mask of the one of the objects, the edge list indicating line segments that define a polyline representing a border of the ground truth mask. For instance, the point selection module can generate the edge list by applying an edge detection filter (e.g., a Canny filter) on the ground truth mask, and applying an RDP algorithm on the results of the edge detection filter to reduce a number of points representing a boundary of the ground truth mask. The point selection module 202 can save the endpoint locations of line segments determined by the RDP algorithm in the edge list. The line segments, when connected together, make up the polyline representing the border of the ground truth mask.

A random number of random locations on the polyline defined by the edge list are generated (block 806). Point selection module 202 can generate a random number of random locations on the polyline defined by the edge list. In one example, the point selection module 202 generates the random number $\mathbb{Z}$ according to a first random variable, such as from a uniform distribution of integers, e.g., from three to six. The point selection module 202 can determine the random locations according to a second random variable, such as from a uniform distribution of angles, e.g., from zero to $\theta$ radians. In one example, the parameter $\theta$ is determined from the random number $\mathbb{Z}$, such as according to $\theta=2\pi/\mathbb{Z}$. The point selection module 202 can then set one of the locations on the polyline and at the angle $\theta$ relative to any suitable point, such as a center of the interior of the polyline. The remaining locations can be based on the first location so that the locations are evenly spaced on the polyline.

The random locations are randomly jittered to form click points (block 808). Point selection module 202 can randomly jitter the random locations to form the click points. The point selection module 202 can randomly jitter the random locations by moving the locations in a random manner In one example, at least some of the random locations are jittered in a direction so that they remain on the polyline. Additionally or alternatively, the point selection module 202 can randomly jitter at least some of the random locations in a direction so that the jittered locations (e.g., the click points) no longer remain on the polyline. The distance of the click points to the polyline can be bounded by a threshold distance, such as to within ten pixels.

In one example, the point selection module 202 randomly jitters the random locations by an amount based on a size of the polyline, such as an area interior to the polyline, the summed length of line segments making up the polyline (e.g., the perimeter length of the polyline), a width of the polyline, a height of the polyline, combinations thereof, and the like. Hence, locations on a larger polyline (e.g., a polyline encompassing a larger area) may be jittered more than locations on a smaller polyline (e.g., a polyline encompassing a smaller area than the larger area). The click points generated from randomly jittering the random locations can simulate user-provided click points for the boundary of an object.

A heat map is generated by applying a Gaussian kernel to the click points (block 810). Heat map module 208 can generate a heat map by applying a Gaussian kernel to the click points. For instance, the mean of the Gaussian kernel can be centered on each of the click points, and the variance of the Gaussian kernel can radially determine the intensity of the heat map.

A region of interest in the image that includes the one of the objects is determined based on the click points (block 812). Region of interest module 206 can determine a region of interest in the image that includes the one of the objects based on the click points. For instance, the region of interest can be determined from a rectangular region that includes the click points.

A mask for the one of the objects is generated with a neural network from the region of interest and the heat map (block 814). Mask generation module 212 can generate, with an encoder-decoder network, a mask for the one of the objects from the region of interest and the heat map. The encoder-decoder network can include an encoder that generates a feature map from a rasterized region determined by rasterizing the region of interest. The encoder-decoder network can also include a convolutional layer that filters the heat map, and a concatenation block that concatenates the feature map with the results of the filtering. The encoder-decoder network can also include a decoder that generates probabilities that pixels of the image belonging to the object based on results of the concatenating, and applies a probability threshold to the probabilities to form the mask. For instance, pixels having a higher probability of belonging to the object than the probability threshold can be included in the mask of the object, and pixels not having a higher probability of belonging to the object than the probability threshold can be excluded from the mask of the object.

At least one coefficient of the neural network is adjusted based on the mask and the ground truth mask (block 816). At least one of the mask generation module 212 or the training module 216 can adjust at least one coefficient of the neural network based on the mask and the ground truth mask. For instance, the training module 216 can evaluate a loss function that combines a foreground loss term and a background loss term, the foreground loss term encouraging inclusion of the pixels of the object in the mask, and the background loss term discouraging inclusion in the mask of additional pixels not of the object. Based on evaluating the loss function, the training module can generate training updates, such as the gradient of the loss function, and provide the training updates to the mask generation module 212. The mask generation module 212 can then update at least one coefficient of a filter used to generate the mask based on the training updates, such as by adding or subtracting an error term from the training updates to the at least one coefficient.

Path mapping module 214 can determine, from the mask of the object, paths of the vector graphics corresponding to the object, allowing a designer to edit the vector graphics of the object in any suitable way, such as changing a parameter of a Bezier curve of the vector graphics of the object to create an animation sequence. The path mapping module 214 can determine the paths of the vector graphics corresponding to the object in a full containment mode or in a partial containment mode, as previously described.

The procedures described herein constitute an improvement over conventional procedures that do not account for user intent, or require user inputs that make it difficult or impossible to segment objects in vector graphics. In contrast, the procedures described herein account for user intent by receiving user input consisting of a limited number of click points. The click points are not required to be precisely on a boundary of an object, and instead can be a number of pixels off from the boundary of an object. Moreover, the procedures described herein focus on a region of interest of an image that is based on the click points, and therefore necessarily includes the object to be segmented. Accordingly, the procedures described herein accurately segment objects of vector graphics images, even when objects are occluded or share a boundary.

Furthermore, the procedures described herein constitute an improvement over conventional procedures that rely on loss functions made up of foreground loss terms without background loss terms. In contrast, the procedures described herein can be used to train systems according to a loss function made up of a combination of a foreground loss term and a background loss term, preventing hallucinations common to conventional procedures.

Moreover, the procedures described herein can generate vector graphics images during training, by randomly combining vector graphics objects from one or more foreground themes with a vector graphics background from a background theme, resulting in virtually an infinite number of training images. The procedures described herein can also generate click points that simulate a user input. The simulated click points can also be generated during training according to one or more random variables, resulting in virtually an infinite number of click points and associated heat maps for training. Accordingly, the procedures described herein result in a persistence of excitation in the training dataset that is simply not possible with conventional training procedures that rely on user annotation or a limited number of training images. Because of the persistence of excitation, the described herein can be used to train neural networks to achieve a setting of that has superior performance in terms of loss functions compared to conventional procedures.

Example Images

Figure 9:
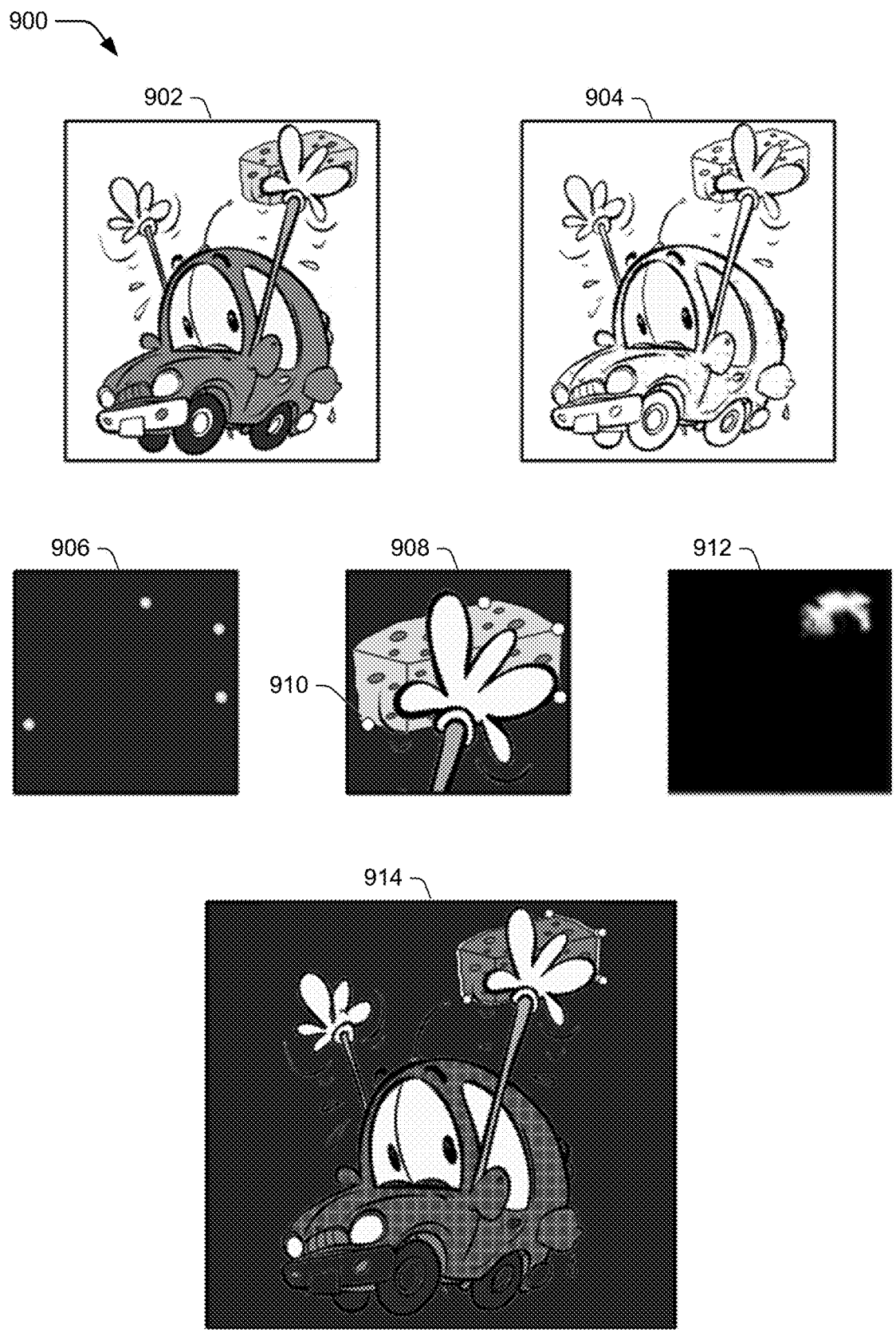
FIGS. 9 and 10 illustrate example images in accordance with one or more aspects of the disclosure.

FIG. 9 illustrates example images 900 in accordance with one or more aspects of the disclosure. Images 900 are examples of images generated by or used by an object segmentation system as described herein, such as system 200 or object segmentation system 106. Images 900 include image 902 that depicts vector graphics of objects that have been rendered, and image 904 that depicts the paths of the vector graphics for the objects rendered in the image 902. As can be seen from the vector graphics paths depicted in image 904, selecting an object with a lasso tool or touch selection tool of a conventional object segmentation system, in which a designer can draw a path on the image to select an object, is difficult if not impossible due to the complexity of the vector graphics, which include a large number of paths, overlapping paths, and paths that are in close proximity to one another.

Images 900 also include heat map 906 and rasterized region 908. Heat map 906 is an example of a heat map generated by heat map module 208 based on the click points 910 that are overlaid on the rasterized region 908. The click points 910 are denoted as white circles, and for clarity, only one of the click points 910 are indicated by a numerical designator. The click points 910 denote a boundary of the sponge in the rasterized region 908. The rasterized region 908 is an example of a rasterized region generated by rasterization module 210 based on a region of interest of the image 902 that includes the click points 910.

Images 900 also include mask image 912 that includes a mask of the sponge in the scale of the image 902. For instance, the mask of the sponge is denoted by white pixels of mask image 912, and black pixels of mask image 912 are excluded from the mask of the sponge. Images 900 also include image 914, which depicts the objects of the original image 902 and the mask of the sponge from mask image 912. In image 914, the mask of the sponge is shaded grey. Despite the sponge being occluded by water drops and the car's hand, the mask accurately segments the sponge.

Figure 10:
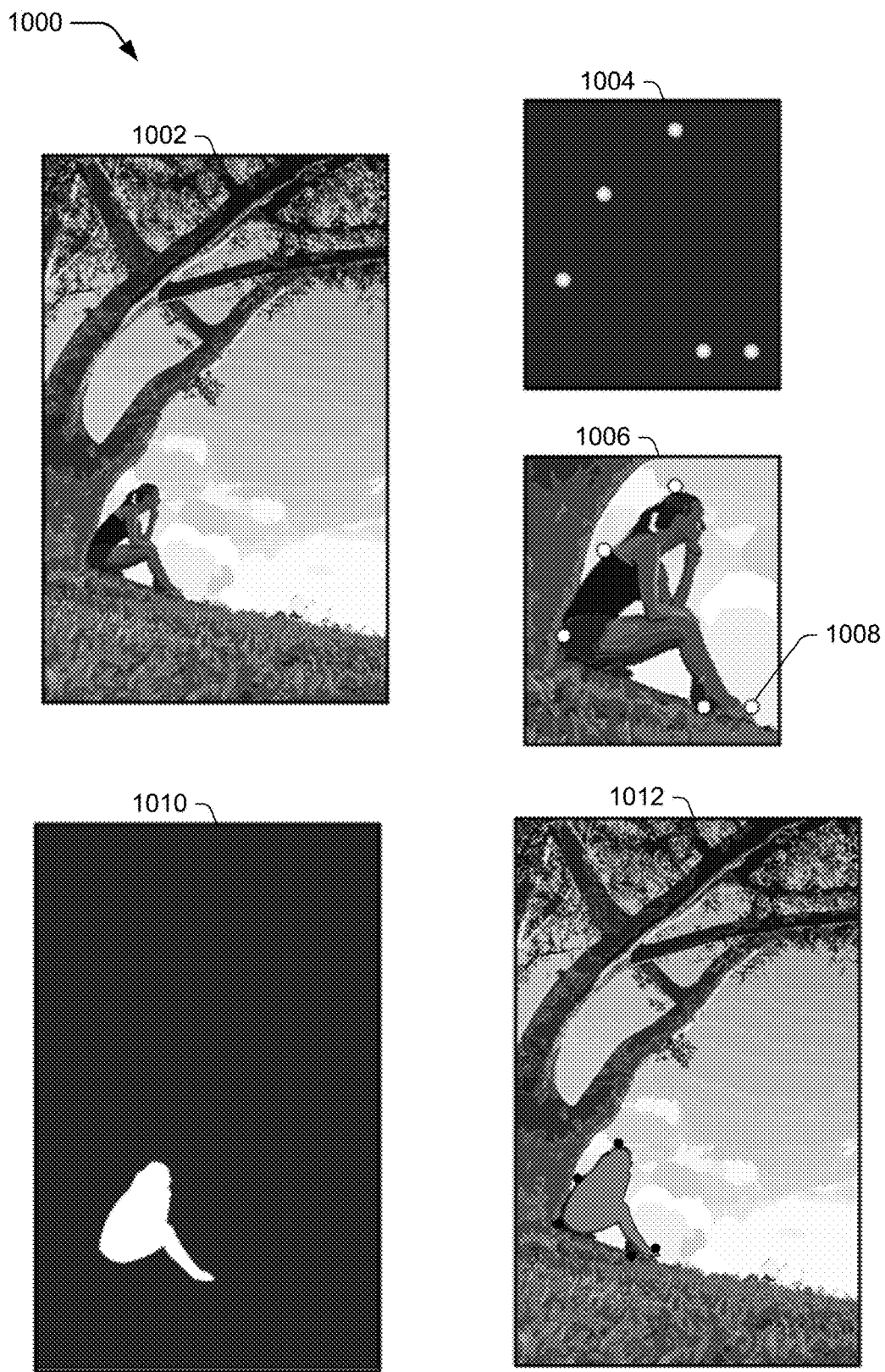

FIG. 10 illustrates example images 1000 in accordance with one or more aspects of the disclosure. Images 1000 are examples of images generated by or used by an object segmentation system as described herein, such as system 200 or object segmentation system 106. Images 1000 include image 1002 that depicts vector graphics of objects that have been rendered, such as persons and trees. Due to the proximity of the objects, such as the person leaning against the tree in image 1002, selecting the person without selecting the tree would be difficult or impossible with conventional object segmentation systems.

Images 1000 also include heat map 1004 and rasterized region 1006. Heat map 1004 is an example of a heat map generated by heat map module 208 based on the click points 1008 that are overlaid on the rasterized region 1006. Click points 1008 are denotes by white circles, and for clarity, only one of the click points 1008 are indicated with a numerical designator. The click points 1008 denote a boundary of the person leaning against the tree, indicating that the person is to be segmented. The rasterized region 1006 is an example of a rasterized region generated by rasterization module 210 based on a region of interest of the image 1002 that includes the click points 1008.

Images 1000 also include image 1010 that includes a mask of the person sitting next to the tree in the scale of the image 1002. Image 1010 is generated based on the heat map 1004 and the rasterized region 1006. The mask of the person is denoted by white pixels of image 1010, and black pixels of image 1010 are excluded from the mask of the person.

Images 1000 also include image 1012, which depicts the objects of the original image 1002, the mask of the person from image 1010, and the click points 1008 on the person. In image 1012, the mask of the person sitting against the tree is shaded grey. Despite the person being in close proximity to the tree (e.g., the person is within only a few pixels of the tree), the mask accurately segments the person.

Example Systems and Devices

Figure 11:
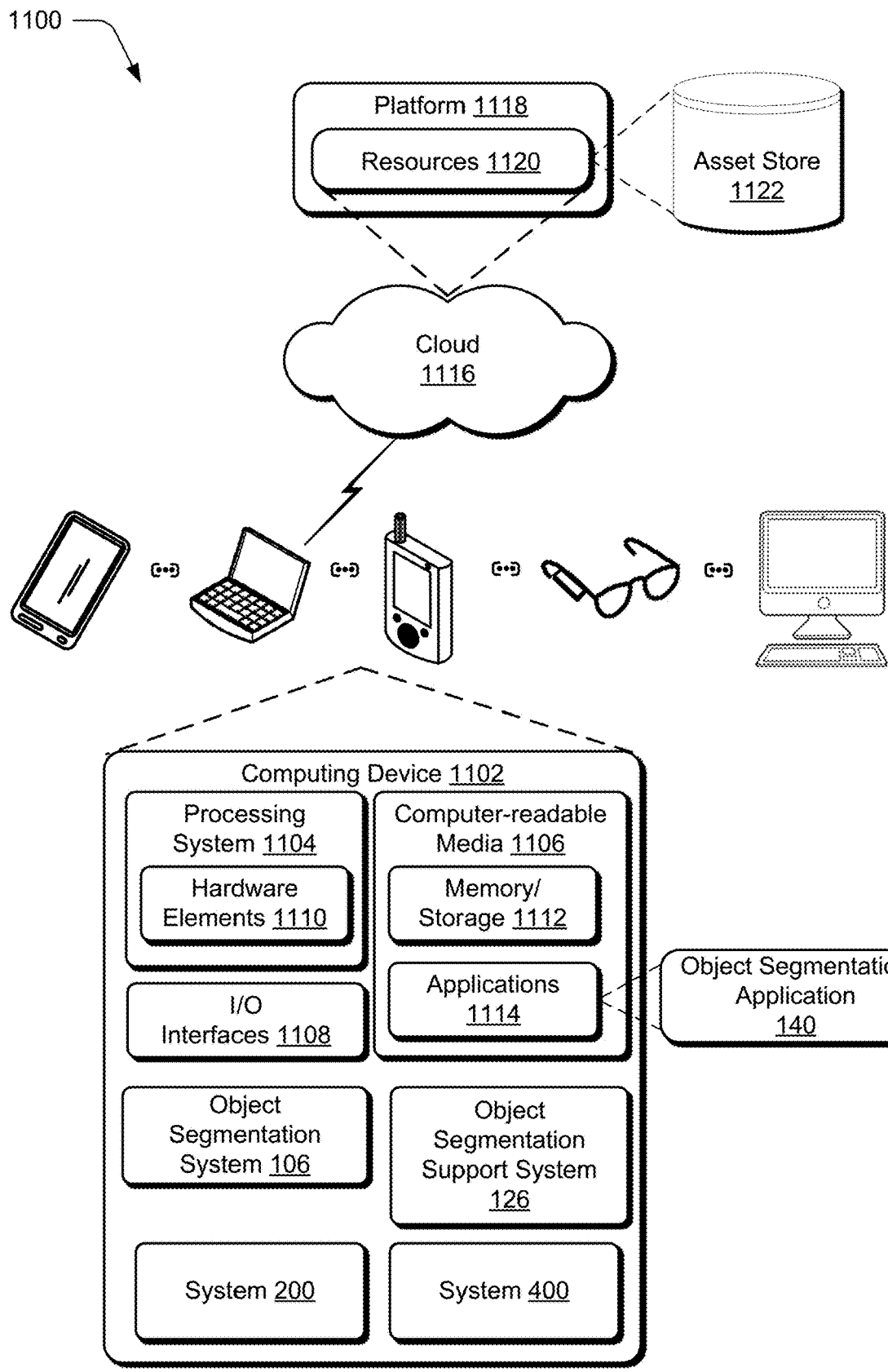
FIG. 11 illustrates an example system including various components of an example device that can be implemented as any type of computing device as described and/or utilized with reference to FIGS. 1-10 to implement aspects of the techniques described herein.

FIG. 11 illustrates an example system 1100 including an example computing device 1102 that is representative of one or more computing systems and devices that can be utilized to implement the various techniques described herein. This is illustrated through inclusion of object segmentation system 106, system 200, system, 400, object segmentation application 140, and object segmentation support system 126, which operate as described above. Computing device 1102 can be, for example, a user computing device (e.g., computing device 104), or a server device of a service provider, (e.g., server 122). Furthermore, computing device 1102 can include an on-chip system, multiple computing devices, combinations thereof, or any other suitable computing device or computing system. Accordingly, FIG. 11 illustrates computing device 1102 as one or more of a tablet, a laptop computer, a smart phone, smart eye glasses, and a desktop computer, though these examples are illustrative and in no way are meant to limit the type or number of devices that can be represented by computing device 1102.

The example computing device 1102 includes a processing system 1104, one or more computer-readable media 1106, and one or more I/O interfaces 1108 that are communicatively coupled to each other. Although not shown, computing device 1102 can further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1104 is representative of functionality to perform one or more operations using hardware. Accordingly, processing system 1104 is illustrated as including hardware elements 1110 that can be configured as processors, functional blocks, and so forth. This may include implementation in hardware as an application specific integrated circuit or other logic device formed using one or more semiconductors. Hardware elements 1110 are not limited by the materials from which they are formed or the processing mechanisms employed therein. For example, processors can be comprised of semiconductor(s) and transistors (e.g., electronic integrated circuits (ICs)). In such a context, processor-executable instructions may be electronically-executable instructions. Processors 130 in FIG. 1 are an example of processing system 1104.

Computer-readable storage media 1106 is illustrated as including memory/storage 1112. Storage 132 in FIG. 1 is an example of memory/storage of memory/storage 1112. Memory/storage 1112 can include volatile media (such as random access memory (RAM)), nonvolatile media (such as read only memory (ROM), flash memory, optical disks, magnetic disks, and so forth), or combinations thereof. Memory/storage 1112 can include fixed media (e.g., RAM, ROM, a fixed hard drive, and so on) as well as removable media (e.g., flash memory, a removable hard drive, an optical disc, and so forth). Computer-readable media 1106 can be configured in a variety of other ways as further described below.

Input/output interfaces 1108 are representative of functionality to allow a user to enter commands and information to computing device 1102, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Accordingly, input/output interfaces 1108 can include a touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Thus, computing device 1102 can be configured in a variety of ways as further described below to support user interaction.

Computing device 1102 also includes applications 1114. Applications 1114 are representative of any suitable applications capable of running on computing device 1102, and can include a web browser which is operable to access various kinds of web-based resources (e.g., images, videos, assets, media clips, images, content, configuration files, services, user profiles, and the like). Applications 1114 include object segmentation application 140, which operate as previously described. Furthermore, applications 1114 may include any applications supporting object segmentation system 106, system 200, system 400, and object segmentation support system 126.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1102. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1110, or combinations thereof. Computing device 1102 may be configured to implement particular instructions and functions corresponding to the software and hardware modules. Accordingly, implementation of a module that is executable by computing device 1102 as software may be achieved at least partially in hardware, e.g., through use of computer-readable storage media and hardware elements 1110 of processing system 1104. The instructions and functions may be executable/operable by one or more articles of manufacture (for example, one or more computing devices such as computing device 1102 or processing systems such as processing system 1104) to implement techniques, modules, and examples described herein.

The techniques described herein may be supported by various configurations of computing device 1102 and are not limited to the specific examples of the techniques described herein. This functionality may also be implemented all or in part through use of a distributed system, such as over a "cloud" 1116 via a platform 1118. Cloud 1116 includes and is representative of a platform 1118 for resources 1120. Platform 1118 abstracts underlying functionality of hardware (e.g., servers) and software resources of cloud 1116. Resources 1120 may include applications, data, or applications and data that can be utilized while computer processing is executed on servers that are remote from computing device 1102. Resources 1120 can also include services provided over the Internet, through a subscriber network, such as a cellular or Wi-Fi network, or combinations thereof. Resources 1120 can include asset store 1022, which stores assets, such as videos, images, vector graphics, artworks, photographs (e.g., user images in a gallery, a database of stock photographs, and the like), documents, user profile data, user image libraries, photographs posted in a shared photo service, animation sequences, metadata of assets, and the like, and may be accessed by computing device 1102.

Generally, resources 1120 may be licensed, purchased, or may be made freely available, (e.g., without authentication, license, or account-based access). The resources 1120 can include any suitable combination of services and content, such as an object segmentation service, image editing service, a video-editing service, an on-line shopping service, a web development and management service, a collaboration service, a social networking service, a messaging service, an advertisement service, a graphics design service, an animation service, an image storage service (including storage of photos, vector graphics, documents, records, files, and the like), a graphics editing service, an asset distribution service, and so forth. Content may include various combinations of assets as described above.

Platform 1118 may abstract resources and functions to connect computing device 1102 with other computing devices. Platform 1118 may also serve to abstract scaling of resources to provide a corresponding level of scale to encountered demand for resources 1120 that are implemented via platform 1118. Accordingly, in an interconnected device embodiment, implementation of functionality described herein may be distributed throughout system 1100. For example, the functionality may be implemented in part on computing device 1102 as well as via platform 1118 that abstracts the functionality of cloud 1116.

CONCLUSION

In one or more implementations, a digital medium environment includes at least one computing device. Systems, devices, and techniques are described herein for segmenting objects in vector graphics images. An object segmentation system is implemented that can account for user intent and accurately and reliably segment objects of vector graphics images, even when the objects are occluded or in close proximity with other objects. The object segmentation system can receive user inputs that indicates an object in a vector graphics image, such as click points on a boundary of an object from a mouse click or keyboard stroke. The object segmentation system can generate a heat map from the click points, such as by applying a Gaussian kernel centered at each of the click points. The object segmentation system can determine a region of interest corresponding to a portion of the image that includes the object, and can rasterize the region of interest. The object segmentation system can provide the heat map and the rasterized region to a convolutional neural network, such as an encoder-decoder network, that generates a mask for the object. The mask identifies pixels in the rasterized region belonging to the object. The object segmentation system can determine paths of the vector graphics corresponding to the object, such as by determining a polyline corresponding to the mask, and determining, based on the polyline, paths of the vector graphics corresponding to the object.

The object segmentation system can be trained according to a loss function that that combines a foreground loss term and a background loss term. The foreground loss term can encourage inclusion of the pixels of the object in the mask, and the background loss term can discourage inclusion in the mask of additional pixels not of the object. Training can include generating vector graphics images by combining vector graphics objects corresponding to a foreground theme and a vector graphics background corresponding to a background theme during training. Training can also include generating, during the training, points that simulate user-provided click points used to form a heat map.

Although implementations of segmenting objects in vector graphics images have been described in language specific to features and/or methods, the appended claims are not necessarily limited to the specific features or methods described. Rather, the specific features and methods are disclosed as example implementations of segmenting objects in vector graphics images, and other equivalent features and methods are intended to be within the scope of the appended claims. Further, various different examples are described and it is to be appreciated that each described example can be implemented independently or in connection with one or more other described examples.

What is claimed is:

1. In a digital medium environment for segmenting objects in vector graphics images, a method implemented by a computing device, the method comprising:
    obtaining points that identify an object in an image, the image composed of vector graphics;
    determining a region of interest in the image that includes the object based on the points that identify the object;
    rasterizing the region of interest to form a rasterized region as a sub-region of the image;
    generating a heat map from the points that identify the object in the image, the heat map representative of the rasterized region;
    generating a mask from the rasterized region and the heat map, the mask identifying pixels of the object in the rasterized region;
    determining a polyline corresponding to the mask, the polyline representing an outline of the mask; and
    determining, based on the polyline, paths of the vector graphics corresponding to the object.

2. The method as described in claim 1, further comprising determining a rectangular region that contains the object, wherein the region of interest is determined based on the rectangular region.

3. The method as described in claim 1, wherein the generating the heat map comprises applying a Gaussian kernel centered at each of the points that identify the object in the image.

4. The method as described in claim 1, wherein the generating the mask comprises:
    generating a feature map with an encoder that receives the rasterized region as an input;
    filtering the heat map; and
    concatenating the feature map with results of the filtering.

5. The method as described in claim 4, wherein the generating the mask further comprises:
    generating, with a decoder, probabilities the pixels correspond to the object based on results of the concatenating; and
    applying a probability threshold to the probabilities to form the mask.

6. The method as described in claim 1, wherein the generating the mask includes evaluating a loss function that combines a foreground loss term and a background loss term, the foreground loss term encouraging inclusion of the pixels of the object in the mask, and the background loss term discouraging inclusion in the mask of additional pixels not of the object.

7. The method as described in claim 1, wherein the determining the paths of the vector graphics corresponding to the object comprises determining the paths as visible paths of the vector graphics that are contained in the mask.

8. The method as described in claim 1, wherein the determining the paths of the vector graphics corresponding to the object comprises determining the paths as visible paths of the vector graphics that intersect an interior of the mask.

9. The method as described in claim 1, further comprising utilizing an encoder-decoder network to generate the mask based on inputs of the rasterized region and the heat map, the encoder-decoder network being trained with vector graphics artworks that include objects belonging to classes, and wherein the object in the image does not belong to the classes.

10. The method as described in claim 9, further comprising generating the vector graphics artworks while the encoder-decoder network is trained.

11. The method as described in claim 1, wherein the points that identify the object in the image are received as user inputs designating the points as a boundary of the object.

12. The method as described in claim 1, wherein the obtaining the points that identify the object in the image comprises:
    determining a ground truth mask of the object;
    determining random locations on a border of the ground truth mask; and
    randomly jittering the random locations to generate the points that identify the object.

13. The method as described in claim 12, further comprising training an encoder-decoder network to generate the mask based on inputs of the rasterized region and the heat map, wherein the points are generated while the encoder-decoder network is trained.

14. An object segmentation system implemented by a computing device for segmenting objects in vector graphics images, the object segmentation system comprising:
    a memory to maintain an image composed of vector graphics; and
    a processor system to implement an object segmentation application at least partially in hardware of the computing device to:
        obtain points that identify an object in the image;
        determine a region of interest in the image that includes the object based on the points that identify the object;
        rasterize only the region of interest in the image to form a rasterized region;
        generate a heat map from the points that identify the object in the image, the heat map representative of the rasterized region;
        generate a mask from the rasterized region and the heat map, the mask identifying pixels of the object in the rasterized region;
        determine a polyline corresponding to the mask, the polyline representing an outline of the mask; and
        determine, based on the polyline, paths of the vector graphics corresponding to the object.

15. The object segmentation system as described in claim 14, wherein the object segmentation application is further implemented to:
    receive an input to operate in a full containment mode or a partial containment mode; and
    determine the paths of the vector graphics as one of visible paths that are contained in an interior of the polyline in the full containment mode, or as the visible paths that intersect the interior of the polyline in the partial containment mode.

16. The object segmentation system as described in claim 14, wherein the object segmentation application is further implemented to:
    receive an input to operate in one of a user mode or a training mode; and one of:
        in the user mode, receive user inputs designating the points as a boundary of the object; or
        in the training mode:
            determine a ground truth mask of the object;
            determine an edge list of the ground truth mask, the edge list indicating line segments that define a polyline representing a border of the ground truth mask;
            determine a random number of random locations on the polyline defined by the edge list; and
            randomly jitter the random locations to form the points.

17. The object segmentation system as described in claim 16, wherein in the training mode, the object segmentation application is further implemented to:
    evaluate a loss function that combines a foreground loss term and a background loss term, the foreground loss term encouraging inclusion of the pixels of the object in the mask, and the background loss term discouraging inclusion in the mask of additional pixels not of the object; and
    update at least one coefficient of a filter used to generate the mask, the at least one coefficient of the filter updated based on the evaluated loss function.

18. In a digital medium environment for segmenting objects in vector graphics images, a method implemented by a computing device, the method comprising:
    a step for determining a region of interest that includes an object in an image having vector graphics, the determining the region of interest based on points on the image corresponding to a boundary of the object;
    a step for rasterizing only the region of interest in the image to form a rasterized region;
    a step for generating a heat map from the points on the image, the heat map representative of the rasterized region;
    a step for generating a mask of the object from the region of interest and the heat map, the mask identifying pixels of the object in the rasterized region;
    a step for determining a polyline corresponding to the mask, the polyline representing an outline of the mask; and
    a step for determining, based on the polyline, paths of the vector graphics corresponding to the object.

19. The method as described in claim 18, wherein the generation of the mask includes evaluating a loss function that combines a foreground loss term and a background loss term, the foreground loss term encouraging inclusion of the pixels of the object in the mask, and the background loss term discouraging inclusion in the mask of additional pixels not of the object.

20. The method as described in claim 18, further comprising:
    a step for receiving an input to operate in a full containment mode or a partial containment mode; and
    a step for determining the paths of the vector graphics as one of visible paths that are contained in an interior of the polyline in the full containment mode, or as the visible paths that intersect the interior of the polyline in the partial containment mode.

\* \* \* \* \*